(12) United States Patent
Doten

(10) Patent No.: US 9,968,810 B2
(45) Date of Patent: May 15, 2018

(54) BUCKET SUPPORTED POLYMER GEL EMULSION PREPARATION SYSTEM

(71) Applicant: Leonard E. Doten, Cold Springs, CA (US)

(72) Inventor: Leonard E. Doten, Cold Springs, CA (US)

(*) Notice: Subject to any disclaimer, the term of this patent is extended or adjusted under 35 U.S.C. 154(b) by 261 days.

(21) Appl. No.: 14/747,794

(22) Filed: Jun. 23, 2015

(65) Prior Publication Data

US 2016/0375284 A1 Dec. 29, 2016
US 2017/0203134 A9 Jul. 20, 2017

Related U.S. Application Data

(63) Continuation-in-part of application No. 12/660,044, filed on Feb. 19, 2010, now Pat. No. 9,192,797.

(51) Int. Cl.
  *A62C 3/02* (2006.01)
  *A62C 5/033* (2006.01)
  *A62C 5/00* (2006.01)

(52) U.S. Cl.
  CPC .......... *A62C 3/0235* (2013.01); *A62C 5/002* (2013.01); *A62C 5/033* (2013.01)

(58) Field of Classification Search
  CPC ....... A62C 3/0235; A62C 5/033; B64C 27/04; B64C 1/16; F04D 13/085
  USPC .......... 239/171; 169/14, 53, 44; 417/423.15
  See application file for complete search history.

(56) References Cited

U.S. PATENT DOCUMENTS

| 4,601,345 A * | 7/1986 | Mahrt ...................... B64D 1/16 169/14 |
| 6,003,782 A * | 12/1999 | Kim ........................ B64D 1/18 169/53 |
| 6,874,734 B2 * | 4/2005 | Ramage ............... A62C 3/0228 169/53 |
| 8,003,001 B1 * | 8/2011 | Kaiser ..................... A62C 3/00 169/44 |

* cited by examiner

*Primary Examiner* — Alexander Valvis
*Assistant Examiner* — Viet Le
(74) *Attorney, Agent, or Firm* — Heisler & Associate

(57) ABSTRACT

The system includes an intake assembly upstream of a pump within the bucket which selectively uses an outer port for drawing water outside of the bucket into the system and an inner port for drawing water from within the bucket into the system. A polymer gel port is interposed between the intake assembly and the pump for combination, mixing and activation of a water and polymer gel emulsion combination within the pump. A fill assembly is provided downstream of the pump which can selectively direct water back into the bucket. A discharge assembly is also provided downstream of the pump which leads to a nozzle or other outlet for water and/or polymer gel emulsion from the system. A control valve selects between delivery of water and/or polymer gel emulsion back into the bucket through the fill assembly or out of the bucket through the discharge.

8 Claims, 15 Drawing Sheets

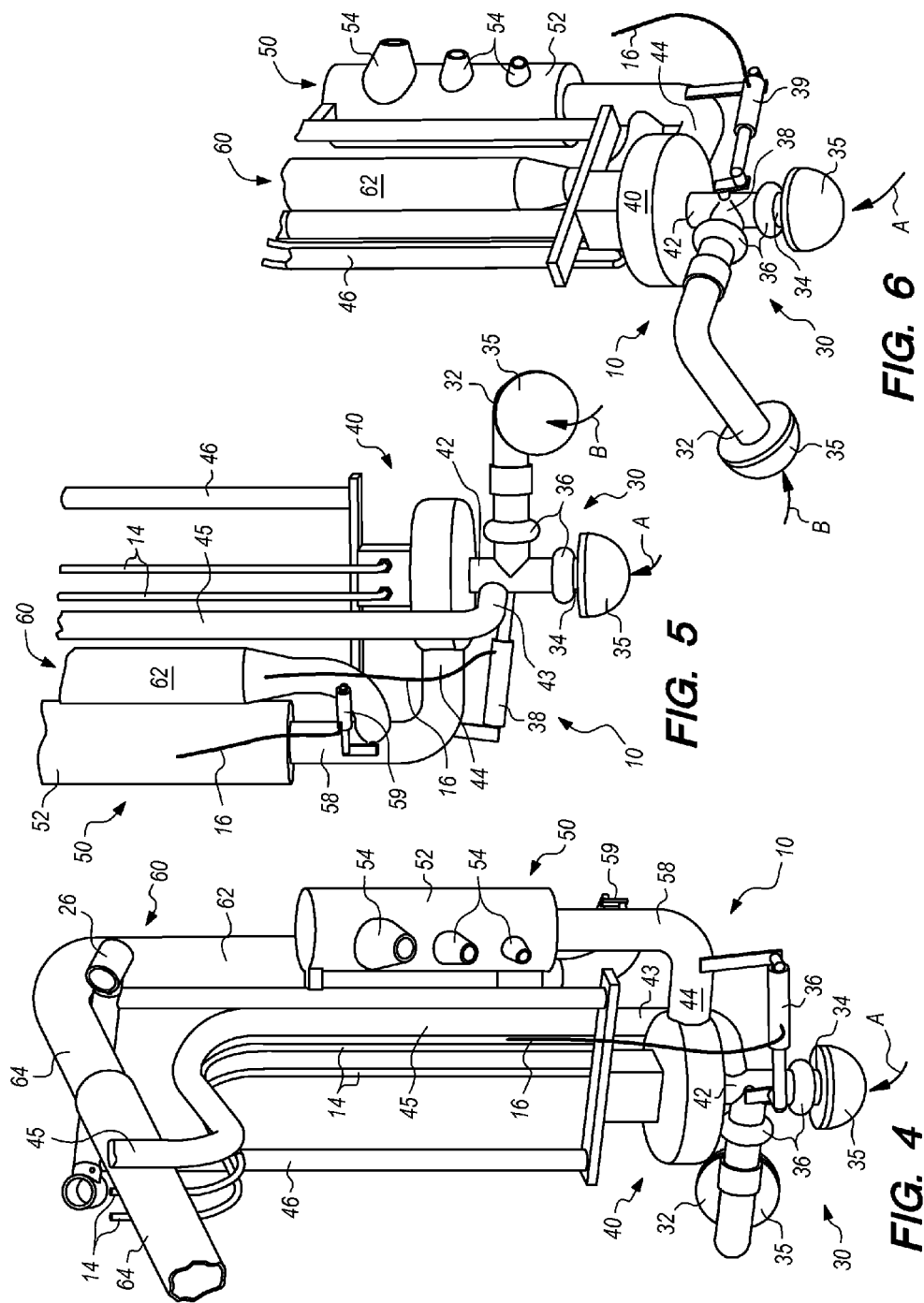

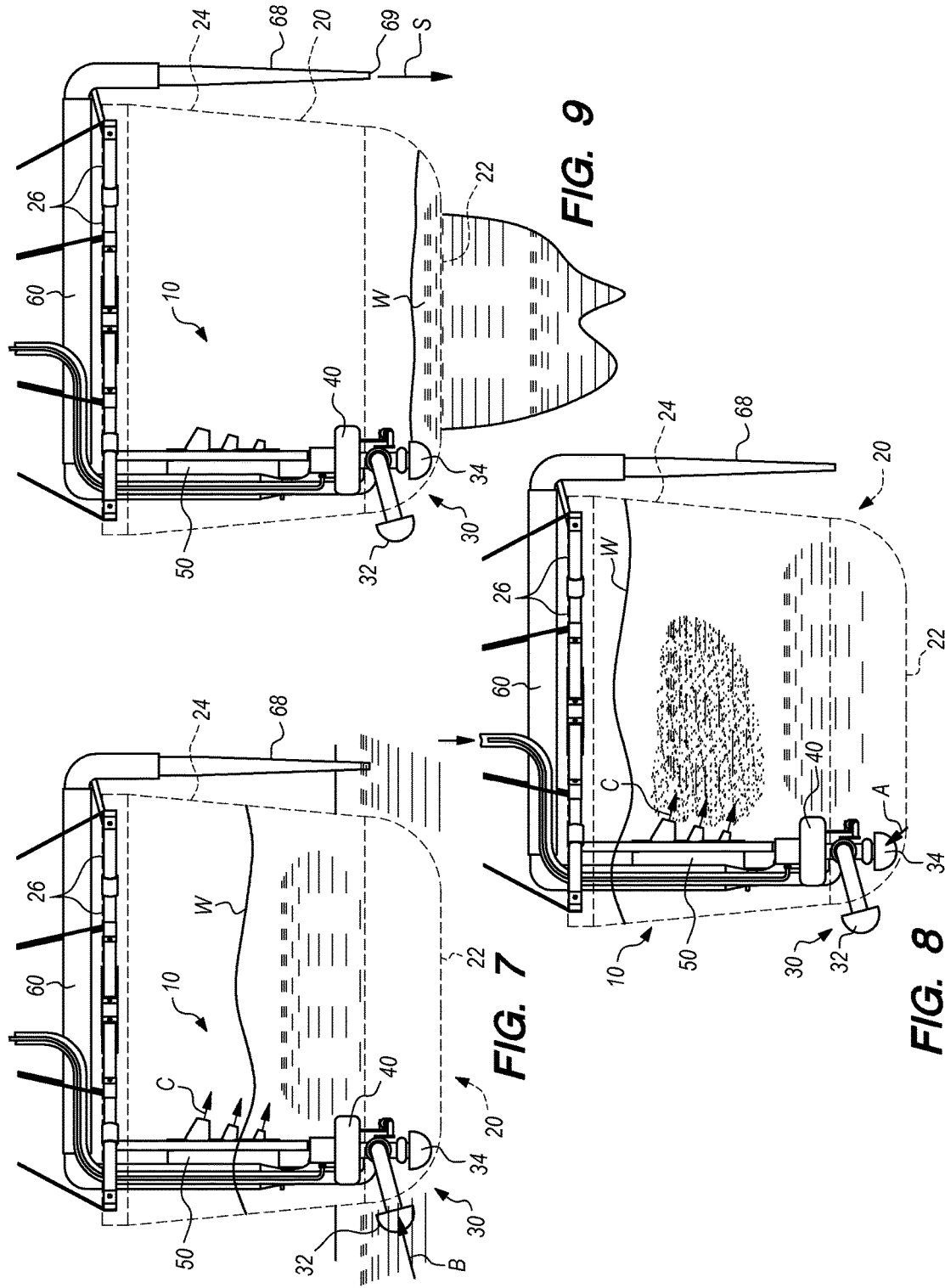

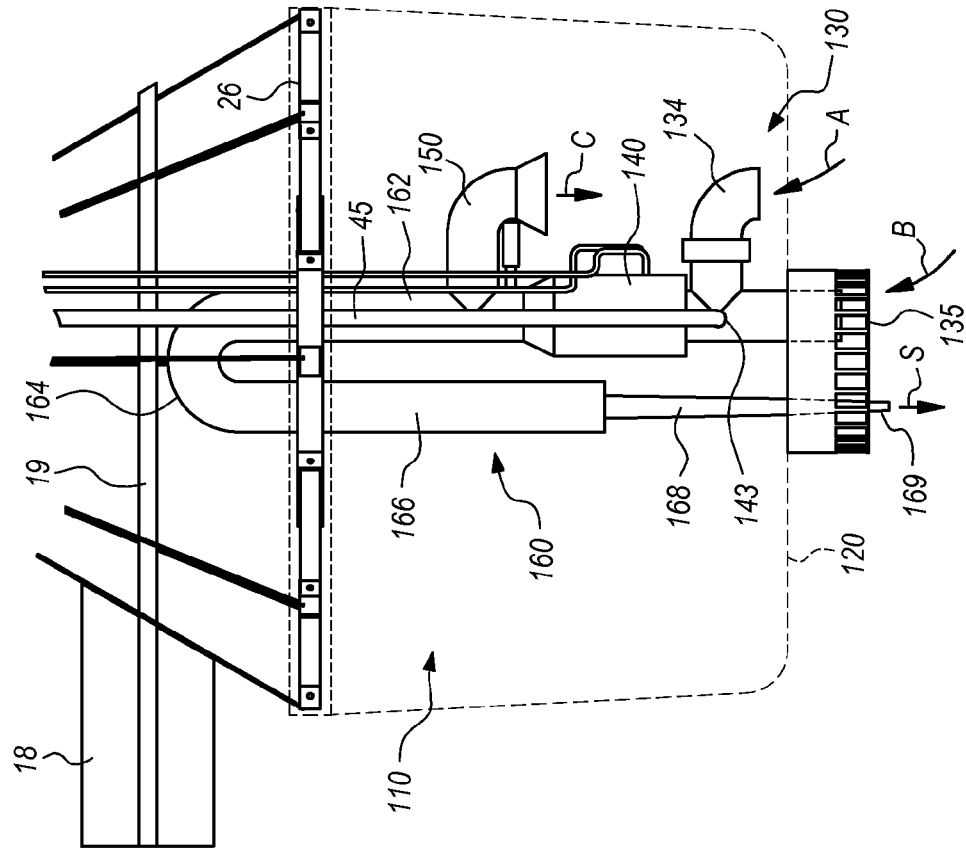
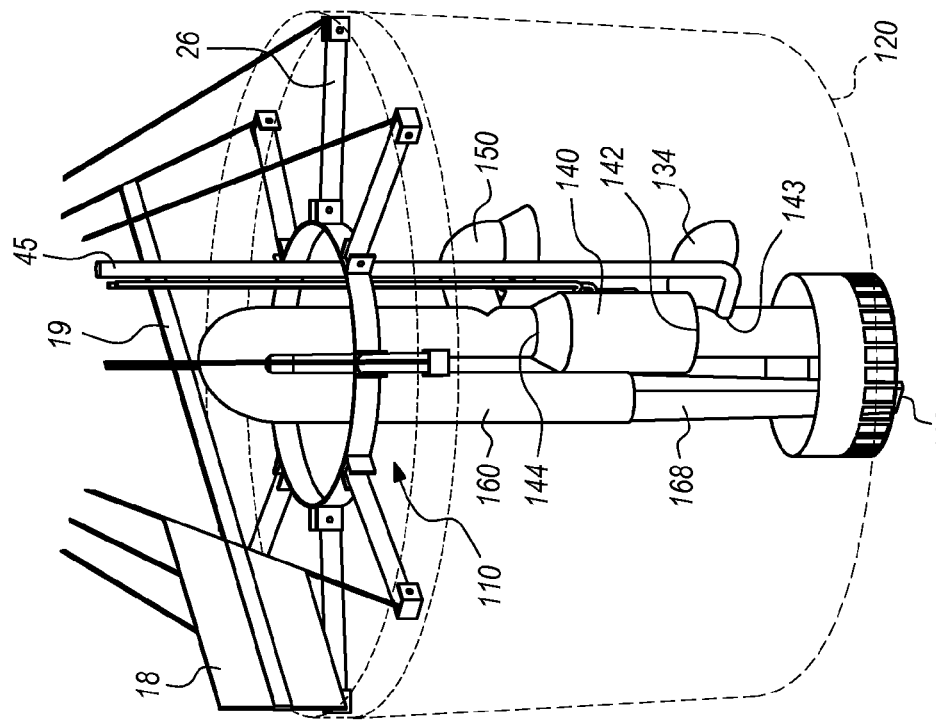

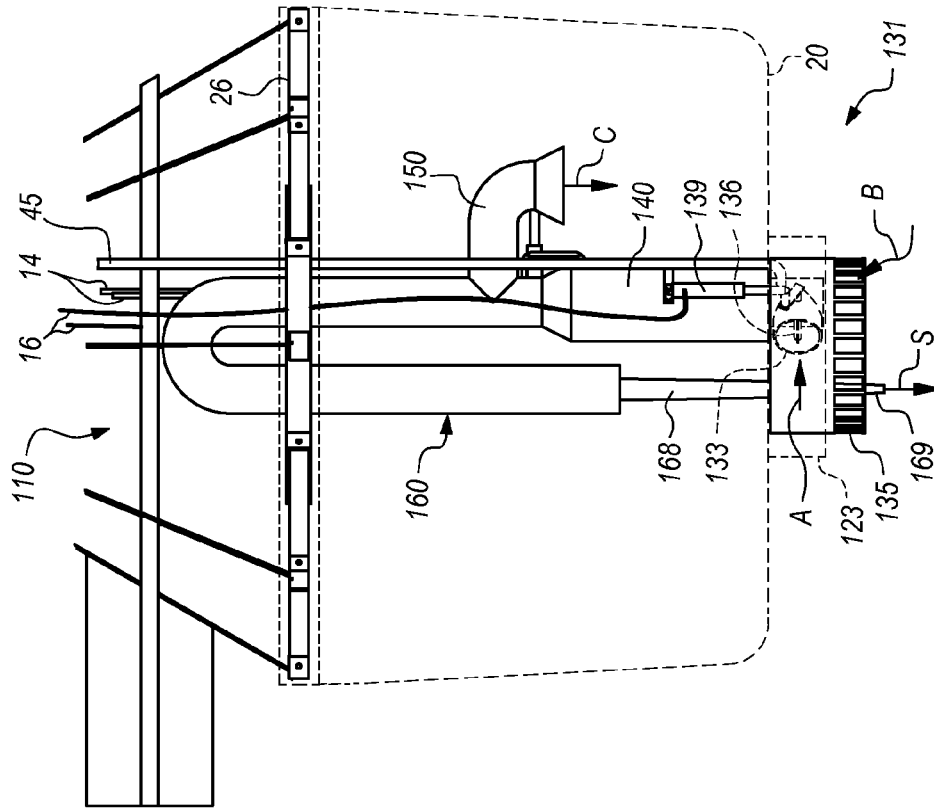
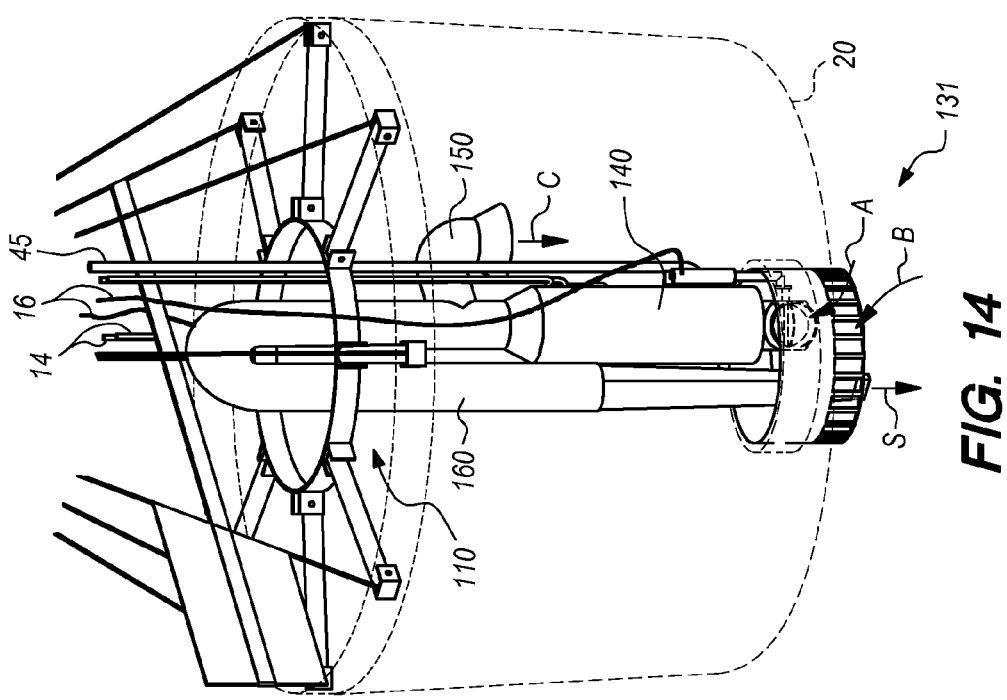

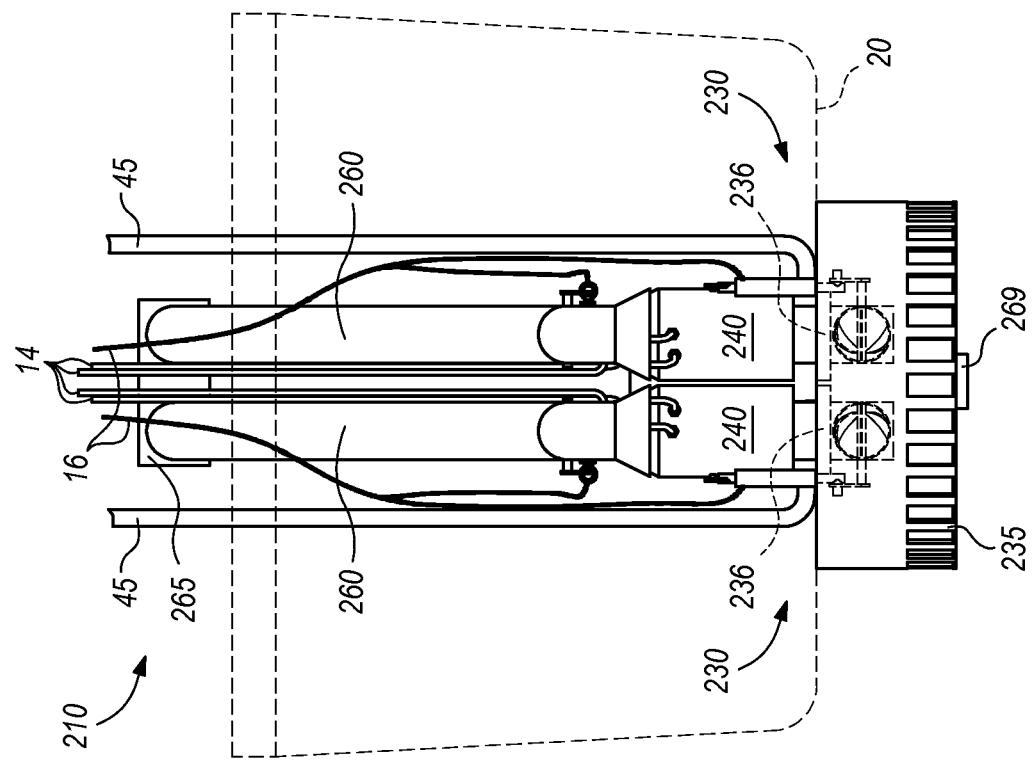

BUCKET SUPPORTED POLYMER GEL EMULSION PREPARATION SYSTEM

FIELD OF THE INVENTION

The following invention relates to firefighting aircraft and particularly rotary wing aircraft which carry buckets suspended therefrom for firefighting. More particularly, this invention relates to firefighting aircraft with buckets suspended therefrom which are also configured to supply polymer gel to the water and fully prepare and activate the water and polymer gel emulsion before delivery for maximum firefighting effectiveness.

BACKGROUND OF THE INVENTION

In the fighting of wildfires, a variety of fire suppression materials are known, as well as equipment for delivery of such fire suppression materials. Perhaps the most common fire suppression material is liquid water. Water can be delivered on a fire, or a space which is to be treated in advance to stop the progression of a fire, in a variety of different ways. For instance, hoses can deliver water from a stationary source such as a fire hydrant, or from a mobile source such as a fire truck. Water tenders are known which can deliver water from tanks on the vehicle to ground adjacent the vehicle, with or without use of hoses.

Aircraft can also be used for delivery of water for fire suppression. While fixed wing aircraft are sometimes used, most often water is delivered by rotating wing aircraft. In a typical such system, a bucket is suspended from a helicopter. The bucket can be dipped into a water reservoir to fill the bucket or be pumped into the bucket. The helicopter then transports the bucket to an area to be treated with the water. A floor or other portion of the bucket is openable to drain the bucket of water and treat the area beneath the bucket. The helicopter then repeats the filling procedure for additional treatment of areas with water. One such line of buckets is provided by S.E.I. Industries, Ltd. of Delta, British Columbia, Canada under the trademark BAMBI BUCKET.

Fire suppression gels are known in the art to have a greater effectiveness in suppressing fire than water alone. Such gels typically begin in the form of a concentrate which can be a solid or a liquid having a high concentration of gel compositions therein. This gel is hydrated to a most desirable water and gel mixture ratio and then is applied to an area to either directly extinguish fire or to treat an area in advance of an approaching fire to impede the progress of the fire, or otherwise suppress fire in the area being treated. Such fire suppression gels, when mixed with water, greatly enhance the effectiveness of the water in suppressing the fire. In particular, the water in the hydrated gel coatings does not evaporate as quickly as water alone, thus maintaining a coating of the area to be treated and discouraging the combustion of combustible materials in the area being treated. One such polymer material is provided under the trademarks FIREWALL ULTRA, provided by BroadRange Wildland Fire Chemicals of Cold Springs, Calif. and FIREWALL II, provided by Eco FireSolutions of Carmichael, Calif., in the form of a liquid emulsion.

While the use of such fire suppression gels is known when treating an area with fire hoses either coupled to stationary sources of water or hydrated gel; or from mobile ground sources (such as tanker trucks), a need exists for an effective airborne fire suppression gel delivery system. While a bucket or other container filled with hydrated gel could be utilized, such an arrangement would be inefficient in that frequent return trips to a source of hydrated gel would be required. Accordingly, a need exists for a system for onboard manufacture of such a water and fire suppression gel mixture on an airborne platform.

Furthermore, water buckets and fixed tanks deliver water to an area to be treated for fire suppression in a rather imprecise manner, merely involving the opening of a lower portion of the bucket or tank. While generally effective for water having a lower fire suppression capacity, with the utilization of fire suppression gel it is desirable that a mixture of water and fire suppression gel be applied to an area to be treated in a precise manner to maximize the fire suppression capability of the gel and minimize the number of repeat trips required and maximize the length of fire line being treated by an airborne vehicle. Thus a need exists for polymer gel emulsion discharge options other than (or augmenting) bucket dumping.

Because various scenarios are presented for the operator of a firefighting aircraft, firefighting systems including those which feature polymer gel emulsion addition to water benefit from multiple selectable modes of operation. A need exists for systems which can either simultaneously draw water into the bucket and dose the water with polymer gel emulsion, or separately first draw the water into the bucket without addition of polymer gel emulsion, followed by a later step of converting the water to a combination of water and activated polymer gel emulsion before discharge. Such systems would also benefit from being able to discharge purely water in certain circumstances.

Building fires were fought for much of history by people flinging buckets of water into burning rooms and buildings. Any nearby source of water could be used and the water was generally delivered at least in the vicinity of the fire. The random nature of where the water actually ended up landing, as compared to where it was most needed, limited its effectiveness. Nonetheless, it was sometimes successful, particularly on relatively small fires. And better than doing nothing at all.

The advent and application of pump and nozzle technologies greatly improved firefighting efficiency and capability. Communities were justly proud of having modern man-powered hand pumpers. The pumpers produced a pressurized stream that could be directed to reach and attack fires without having the limitations of flinging bucket loads into the fire's general direction. Greater volumes of water could be intentionally put were it was useful and effective. The element of the random pattern in which varying amounts of water landed was removed. A major technological bridge had been crossed.

The arrival of first steam and then internal combustion power enhanced these technologies further. They allowed pumps to create stronger, larger and more numerous pressurized streams. The ability to put water were it was most needed still remained the key component. Improved pumping capacity facilitated and expanded the overall capability but was not, in and of itself, very useful without the improved, more accurate delivery method.

Helicopter delivery systems for use on wildland fires (while better than nothing) are stuck in the antiquated bucket brigade era. They fling an undirected volume at the fire. They rely on gravity alone to place their loads without being able to have much control over the placement on the ground. The patterns created lack much uniformity—over treating some areas and under treating others—in a somewhat random manner. They spread out their loads to the point where inconsistent, ineffective distribution exists requiring the dumping of overly large amounts to compensate for this shortcoming. Just like the bucket brigades of old.

Pressurizing the contents of helicopter buckets by using a pump to deliver it downward, forming coherent streams with nozzles and aiming them in a consistent way at the ground offers the same potential to advance wildland firefighting. This advance would be similar to what occurred earlier in the adoption of those technologies for fighting building fires. And it offers an opportunity to use something more effective than water on fires as well.

The hardware components and technological knowhow already exists to allow these technologies to be added to existing helicopter buckets. Equipment installed to upgrade existing bucket brigade era systems can bring the benefits of these recognized firefighting advantages to aerial delivery. These upgrades also allow for improvement over plain water drops, leveraging the results of the changes. They allow the use of polymer. The airborne production of a valuable firefighting agent as a replacement for plain water, thus further enhancing the benefits of such a system.

Water quickly runs off of most plant materials but gel does not. Gel can keep many multiples of the amount of water in fuels than can plain water. According to this invention, gel can be produced immediately from buckets containing only water and without the gel being introduced into the bucket. Without risk, refills can be made from any water source available for conventional dipping, including locally existing sources, adding flexibility.

All in all, the opportunity exists to improve firefighting, reduce costs and address the shortcomings of the present hardware and the type of firefighting agent used by progressing beyond the bucket brigade age that firefighting aircraft are stuck in. The results of seemingly simple improvements are evident in how building fires are fought and controlled today as contrasted with what was possible in the bucket brigade era. The technological bridge that was crossed long ago for fighting building fires can also now be crossed for aircraft operating on wildland fires, exploiting and expanding the advantages found in their present use.

SUMMARY OF THE INVENTION

With this invention a polymer gel emulsion preparation system is provided which can be retrofitted into a bucket or configured along with a bucket for suspension beneath a fire fighting aircraft. The system resides within or is otherwise carried by the bucket, adding the ability for a fire fighter to add polymer gel emulsion to the water to maximize fire fighting effectiveness. Control over when the water is prepared with polymer gel emulsion is provided according to various embodiments of this invention to provide flexibility to the operator in determining when to convert a load of water to combined water and activated polymer gel emulsion. Other adjustable parameters are also facilitated, such as an amount of polymer gel emulsion to add to the water and how to discharge the water and polymer gel emulsion combination onto an area to be defended from fire, such as vegetation in a wildfire area.

The system includes an intake assembly near a lower portion thereof and within the bucket. The intake assembly preferably includes both an outer port and an inner port. The outer port is configured to draw water from outside of the bucket, such as when the bucket has been lowered into contact with a body of water, or to draw water from the inner port within the bucket. Water can also (or as an exclusive alternative) be loaded into the bucket by dipping of the bucket into a body of water.

The intake assembly is provided upstream of a pump also typically located within the bucket. This pump acts both as a prime mover to move water, such as from outside the bucket to inside the bucket, as well as a mixer and as an activator of polymer gel emulsion and water through shearing forces applied to the water and polymer gel emulsion by an impeller of the pump. The pump also energizes the water and polymer gel emulsion combination (or conceivably just the water) for direction to a discharge assembly where the water is delivered to an area to be defended from fire. To cause the polymer gel to be added in such a way that it is activated by the pump, a polymer gel port is located upstream of the pump and downstream of the intake assembly. The polymer gel port is supplied with polymer gel from a supply line leading from a source of polymer gel, such as a pod suspended from the aircraft and above the bucket, or a polymer gel container carried directly upon the aircraft, or a container otherwise supported by the bucket.

Downstream of the pump, a fill assembly is provided with ports configured to return water and/or polymer gel emulsion into the interior of the bucket. In various configurations this fill assembly can be configured to maximize dynamic energy such that the fill assembly can also function to mix water and polymer gel emulsion within the bucket, or with a diffuser to minimize energy at discharge from the fill assembly, such as to prevent splashing of water and/or polymer gel emulsion out of the bucket. The fill assembly can be used to fill the bucket with water (with or without addition of polymer gel emulsion) from outside the bucket, or to cycle water from within the bucket while adding polymer gel emulsion thereto, or for mixing of a pre-existing water and activated polymer gel combination.

A discharge assembly is also provided downstream of the pump. The discharge assembly leads to an outlet for water or combined water and activated polymer gel, preferably through a nozzle pointed mostly downward. This allows for controlled application of water and polymer gel emulsion (or conceivably just water), such as in a stripe upon an area to be defended from wildfire. Dumping from an openable floor of the bucket is also an option.

Control valves are provided in a preferred form of the invention to allow the intake assembly to draw water either from outside of the bucket or from within the bucket, and to provide for flow of water and/or polymer gel emulsion downstream of the pump either back into the bucket through the fill assembly or out of the bucket through the discharge assembly. Another variable under control of an operator is whether polymer gel emulsion is added before the pump or not. The entire system can be configured to be modular for retrofitting into an existing bucket, or for adaptation into an existing bucket with minimal design changes to the bucket, or can be provided in an integrated fashion within a new bucket. The system can be sized up to high capacity and/or high output variations, such as by providing a pair of pumps and/or intake assemblies in tandem, as well as water fill assemblies and discharge assemblies in tandem.

OBJECTS OF THE INVENTION

Accordingly, a primary object of the present invention is to provide a polymer gel preparation system which can be supported within a bucket suspended from an aircraft.

Another object of the present invention is to provide a polymer gel emulsion preparation system which can draw water to be added with polymer gel from either outside of the bucket or from within an interior of the bucket.

Another object of the present invention is to provide a polymer gel emulsion preparation system which can deliver polymer gel from a pump back into the bucket such as for mixing and/or activation of polymer gel emulsion, or for discharge of water and/or polymer gel emulsion out of the bucket.

Another object of the present invention is to provide a system for controlled discharge of water and polymer gel emulsion onto an area to be defended from fire.

Another object of the present invention is to provide a polymer gel emulsion preparation system which does not add polymer gel to the water until an operator determines that a load of water already taken onboard is best combined with polymer gel emulsion before discharge from the bucket.

Another object of the present invention is to provide a polymer gel emulsion preparation system which is configured to avoid discharge of polymer gel emulsion at any location other than at a site where an area is being defended from wildfire.

Another object of the present invention is to provide a polymer gel emulsion preparation system which is self cleaning at the end of a water and polymer gel emulsion discharge cycle.

Another object of the present invention is to provide a polymer gel emulsion preparation system which is at least partially modular for retrofitting onto existing buckets suspendable from an aircraft.

Another object of the present invention is to provide a method for fighting wildfire with a water and activated polymer gel combination which is usable with an aircraft suspended bucket.

Another object of the present invention is to provide a firefighting aircraft with a suspended bucket which can prepare a water and polymer gel emulsion combination on demand to enhance firefighting effectiveness.

Another object of the present invention is to provide a method for applying a firefighting liquid onto terrain ahead of a fire or directly upon the fire to fight the spread of the fire.

Another object of the present invention is to provide a method for controlling coverage levels by which firefighting liquids are applied to terrain including vegetation or structures or other items in the fighting of a fire.

Another object of the present invention is to provide a method for controlling a width of a stripe of firefighting liquid applied to terrain as well as coverage levels for the liquid within the stripe.

Other further objects of the present invention will become apparent from a careful reading of the included drawing figures, the claims and detailed description of the invention.

BRIEF DESCRIPTION OF THE DRAWINGS

FIG. 4 is a perspective view of the polymer gel emulsion preparation system of FIG. 3 with the bucket removed to clearly show details of the system.

FIG. 5 is a detail of a lower portion of that which is shown in FIG. 4.

FIG. 6 is a further detail of a portion of that which is shown in FIG. 4, from an alternate perspective than that depicted in FIG. 5.

FIGS. 7-9 are front elevation views of the system of FIGS. 3-6 shown in various modes of operation thereof for filling of the bucket, addition of polymer gel emulsion to the water, mixing of water and polymer gel emulsion within the bucket and discharge of water or a water and activated polymer gel combination from the bucket.

FIG. 10 is a perspective view of a second embodiment of this invention in a modular form and located within a bucket.

FIG. 11 is a front elevation view of that which is shown in FIG. 10.

FIG. 14 is a perspective view of a modified version of that which is shown in FIG. 10, with the bucket including a sump recess at a lower portion thereof and with an inner port of the intake assembly located within the sump recess.

FIG. 15 is a front elevation view of that which is shown in FIG. 14.

FIG. 20 is a front elevation view of that which is shown in FIG. 19.

Figure 1:
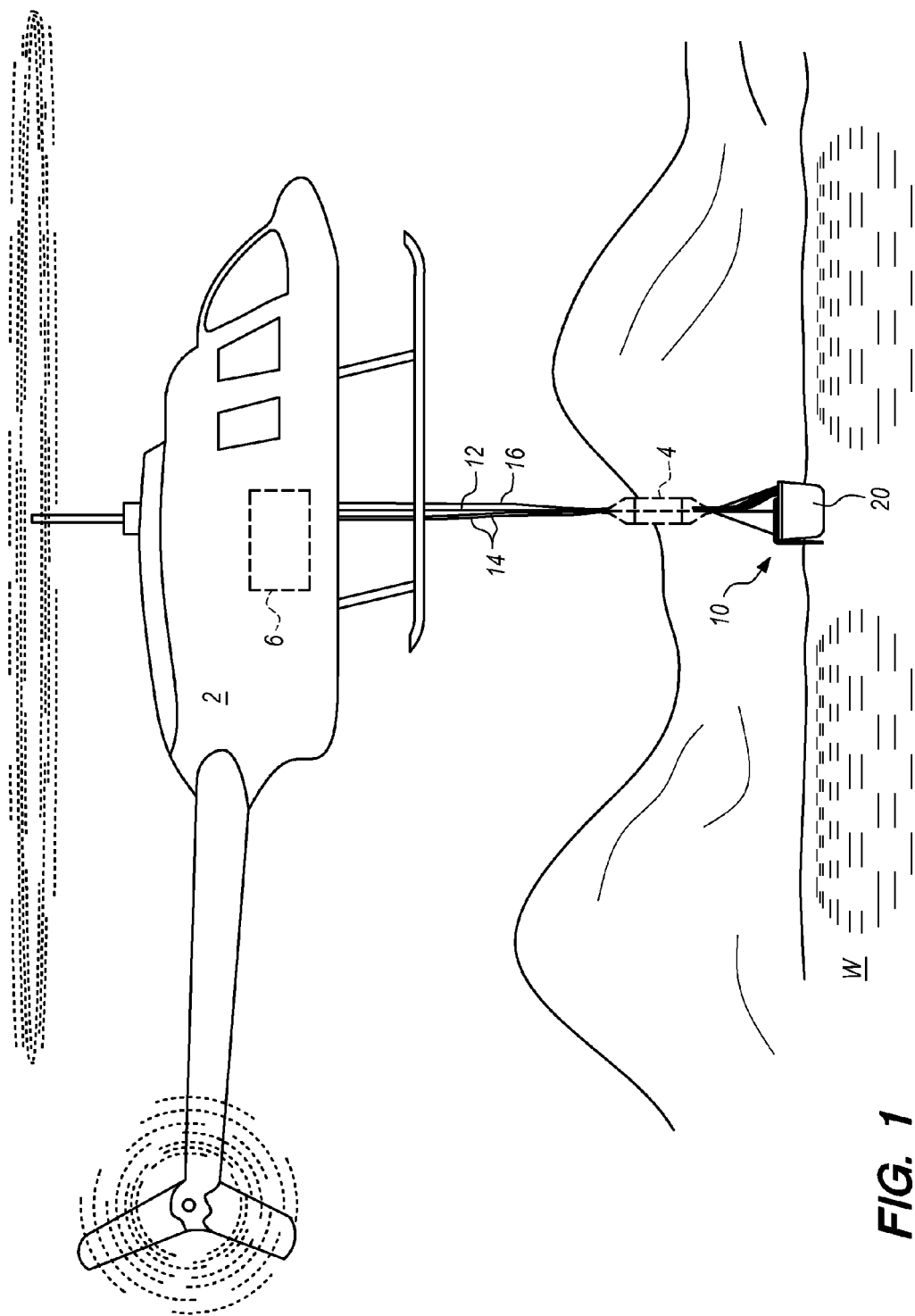
FIG. 1 is a side elevation view of an aircraft with a bucket suspended beneath according to this invention.

DESCRIPTION OF THE PREFERRED EMBODIMENT

Referring to the drawings, wherein like reference numerals represent like parts throughout the various drawing figures, reference numeral 10 is directed to a polymer gel emulsion preparation system (FIGS. 1-3). The system is retrofitted into or built into a bucket 20 suspended from an aircraft 2. The system 10 includes different modes of operation (FIGS. 7-9) for flexibly loading the bucket 20 with water W and also selectively combining the water with polymer gel emulsion while activating the polymer gel emulsion. The system also flexibly provides for discharge of water alone or a water and polymer gel emulsion combination in various ways for fighting wildfire.

In essence, and with particular reference to FIG. 3, basic details of the system 10 are described, according to a first embodiment. The system 10 includes an intake assembly 30 which can selectively draw water W either from outside of the bucket 20 through an outer port 32 (arrow B) or from inside the bucket 20 through an inner port 34 (arrow A). The bucket 20 can also be filled by dipping the bucket 20 into a body of water W (FIG. 1). A pump 40 is provided downstream of the intake assembly 30. This pump 40 has a polymer gel port 43 between the intake assembly 30 and the pump 40 which can selectively dose the water W supplied by the intake assembly 30 before entering the pump 40. The pump 40 both pressurizes the water and also includes an impeller which imparts sufficient dynamic energy upon the polymer gel emulsion and water combination to shear the polymer gel emulsion and fully activate the polymer gel emulsion for maximum firefighting effectiveness.

The pump 40 feeds water or the water and activated polymer gel emulsion combination either to a fill assembly 50 leading back into the bucket 20, or a discharge assembly 60 for directing the water W or water and activated polymer gel emulsion combination from the bucket 20. The discharge assembly 60 preferably includes a nozzle 68 for spraying (arrow S) the liquid in a controlled fashion, such as for striping vegetation or other fuel to inhibit the fire. The discharge assembly 60 can also alternatively include the bucket 20 configured to also allow for dumping therefrom, such as by having a floor 22 of the bucket 20 configured to be openable.

More specifically, and with particular reference to FIGS. 1 and 2, details of an aircraft 2 and equipment for supplying the system 10 are described, according to this first embodiment, as well as other similar embodiments. The aircraft 2 is preferably a helicopter or other rotary wing aircraft having at least one rotor. The aircraft 2 preferably carries a source of polymer gel. In one embodiment a pod 4 is suspended along a cable 12 or other line which suspends the bucket 20 from the aircraft 2, with the pod 4 including a tank for polymer gel. In another embodiment, a polymer gel tank 6 is carried within the aircraft 2 itself. A polymer gel supply line 45 leads from the pod 4 or polymer gel tank 6 down to the bucket 20 where it feeds polymer gel selectively to the polymer gel port 43 upstream of the pump 40.

Polymer gel can be supplied by gravity, but most preferably is supplied by a dosing pump, which is speed controlled or otherwise controlled to meter flow of polymer gel, and/or through a valve to control a rate of flow of polymer gel through the polymer gel port 43 for addition to water W. The polymer gel from the pod 4 or other polymer gel tank 6 is typically in a liquid form and is typically provided as an emulsion, in a form ready to be added to water W and ready to be activated by imparting shear to the water and polymer gel combination. As an alternative, the polymer gel can be provided in other states, concentrations and configurations suitable for the particular polymer gel chemistry and physical attributes thereof.

The bucket 20 is suspended by a cable 12 or other line from the aircraft 2. Typically, additional lines are also routed along the cable 12 including power lines 14 which lead to the pump 40 and power the operation of the pump 40. The power lines 14 can provide power, such as by flow of hydraulic fluid or electric power or pneumatic or other power supply. At least one control line 16 also preferably extends down along the cable 12 which provides control signals to various control valves and valve actuators (as well as other controllable subcomponents). This control line 16 can include a bundle of separate lines which each go to separate valves and/or actuators for control thereof, or can be a single control line 16 with control signals passed therealong encoded so that different valves and/or valve actuators can be distinguished from each other and effectively caused to operate (or not) based on instructions encoded within a control signal sent along the control line 16. The power lines 14 and control line 16 interface with control equipment on the aircraft 2. This control equipment can be to some extent automated or manually operated, such as by a pilot or mission specialist on board the aircraft 2 or located remotely.

Most preferably, the bucket 20 includes a rudder 18 supported thereon, such as mounted to a boom 19 extending substantially horizontally from an upper portion of the bucket 20 and away from lateral upper edges of the bucket 20. Most preferably, this rudder 18 is located on a side of the bucket 20 similar to a side where the nozzle 68 of the discharge assembly 60 is located. The rudder 18 is preferably a passive device which merely causes the side of the bucket 20 having the rudder 18 thereon to reliably trail behind other portions of the bucket 20 as the aircraft 2 is in motion horizontally through the air. In this way, the bucket 20 resists excessive rotation and the nozzle 68 tends to have a reliable position and orientation for maximizing precision in delivery of water or combined water and polymer gel from the nozzle 68 (along arrow S of FIG. 3). While the rudder 18 is shown as generally rectangular, it could have a variety of different shapes and sizes. While the cable 12, power lines 14 and control lines 16 are shown as separate elongate structures, it is conceivable that they could be integrated together into as few as a single line with subparts thereof acting as the cable 12 or other line for structural support of the bucket 20, and lines to provide power and control for elements of the system 10 within the bucket 20.

With particular reference to FIGS. 3-9, details of the intake assembly 30 of the system 10 are described, according to this first embodiment. The intake assembly 30 feeds water (most typically but also potentially a water and polymer gel combination) into the pump 40, either for supply into the bucket 20 (arrow B) through the fill assembly 50 (arrow C) or supply from within the bucket 20 (arrow A) out of the bucket 20 through the discharge assembly 60 (arrow S).

The intake assembly 30 includes an outer port 32 and an inner port 34 in this first embodiment. Variations on this embodiment could conceivably include only the outer port 32 or only the inner port 34. The outer port 32 provides for fill of the bucket 20 (arrow B), especially from shallow water sources W, with deeper water sources W allowing for the bucket to be filled by dipping. Screens 35 are preferably provided overlying each port 32, 34, with a screen 35 adjacent the outer port 32 generally most important, in that water W from surrounding bodies of water can thus be screened of large objects which would not pass successfully through the pump 40. Check valves 36 are preferably provided downstream of each port 32, 34. These check valves 36 keep liquids from flowing back out of the ports 32, 34 away from the pump 40, such as when the pump 40 ceases operation. The check valves 36 can be as simple as plates spanning each port 32, 34 with a spring or other biasing element biasing the valves 36 in a closed position unless the pump 40 is operating and suction from the pump 40 causes the check valves 36 to open.

The two ports 32, 34 lead to the pump 40, but preferably come together at a junction upstream of an input 42 on the pump 40. A control valve 38 is provided at this junction or elsewhere within the intake assembly 30 so that flow into the input 42 of the pump 40 is limited to either flow through the outer port 32 or flow through the inner port 34. This control valve 38 is in this embodiment coupled to an actuator 39, such as in the form of an electric solenoid, or a pneumatic or hydraulic cylinder or other linear or rotational displacement transducer which can convert a control signal into operation to change a position of the control valve 38.

Most typically, the control valve 38 rotates and is configured as a three way valve with the three ways out of a body of the control valve 38 including a pathway leading from the outer port 32, a pathway leading from the inner port 34 and a pathway leading to the input 42 of the pump 40. The control valve 38 includes a control element which either links the outer port 32 to the input 42 or links the inner port 34 to the input 42. Conceivably, this control valve 38 could also be configured to have other states such as a state where both the outer port 32 and inner port 34 can simultaneously intake liquid (such as for simultaneous bucket 20 fill and mixing) or the control valve 38 can have states where both ports 32, 34 are closed (such as to provide redundancy for the check valves 36 during periods of non-operation of the intake assembly 30).

The position of the control valve 38 is selected by an operator or an automated system to allow the overall polymer gel emulsion preparation system 10 of this invention to operate according to various different modes. These include modes for filling of the bucket 20, mixing within the bucket 20, addition of polymer gel to water W, and supply of water or combined water and activated polymer gel to the discharge assembly 60 for delivery from the bucket 20.

In embodiments where only the inner port 34 is provided for the intake assembly 30, the bucket 20 can still be filled, such as by dipping the bucket 20 into a body of water W (FIG. 1). In embodiments where only the outer port 32 is provided, water W can be drawn into the pump 40 through the outer port 32, and have polymer gel added thereto through the polymer gel port 43 with activation of the water and polymer gel emulsion combination together and fill into the bucket 20. The water and polymer gel emulsion combination can then later be discharged, such as by dumping the bucket 20. However, most preferably both the outer port 32 and inner port 34 are provided together with the control valve 36 therebetween to selectively cause fluid to be fed into the pump 40, either through the outer port 32 or through the inner port 34.

With continuing reference to FIGS. 3-9, details of the pump 40 are described, according to this first embodiment. The pump 40 acts as both a prime mover and energizer of fluids within the system 10 and also as a mixer and to impart shear sufficient to activate polymer gel emulsion along with water to provide a water and polymer gel emulsion combination, fully activated for maximum effectiveness in fighting wildfire.

The pump 40 includes an input 42 on an upstream side thereof opposite an output 44 downstream of the pump 40. A structural support 46 suspends the pump 40 within the bucket 20 at a position where desired, and generally positioning the pump 40 near a lower end of the bucket 20. This structural support 46 can suspend directly down from the cable 12 from the aircraft 2, or from an upper end/rim above a side wall 24 of the bucket 20, or allow the pump 40 to be suspended up off of a floor 22, or off of the side wall 24 of the bucket 20.

The bucket 20 will in typical embodiments have a spider 26 (FIGS. 3 and 7-9) which keeps the bucket 20 open, especially during dipping, and spans upper portions of the side wall 24 of the bucket 20. This spider 26 includes multiple arms which connect to upper portions of the side wall 24 and come together typically at a ring. The cable 12 is separately coupled to the bucket, such as through sub-cables leading to upper portions of the side wall 24. In other embodiments, multiple suspension cables extend from portions of the arms of the spider 26 to the cable 12, such as through a common fastener which can connect to a lower end of the cable 12. While the structural support 46 is preferably a separate structure which carries the weight of the pump 40 to the bucket 20 and/or cable 12, it is conceivable that portions of the fill assembly 50 and/or discharge assembly 60 can double to provide structural support such as to carry the pump 40, so that the structural support 46 is not required in such embodiments (see FIGS. 10-24).

The pump 40 is configured to have polymer gel added to water before passing through the input 42 by supply of polymer gel through the polymer gel port 43 upstream of the input 42. This polymer gel port 43 is fed by a polymer gel supply line 45 leading to the pod 4 or polymer gel tank 6 carried by the aircraft 2 (FIG. 1). Somewhere along this line 45, and typically near the polymer gel port 43, a valve (and preferably also a dosing pump) is provided to allow for the flow of polymer gel through the polymer gel port 43 to be controlled so that polymer gel is not always being added to water W flow into the pump 40. This valve would be controlled, such as through signals supplied along the control line 16 with either automatic control or manual control by an operator.

The pump 40 is preferably a dynamic pump which includes a rotating impeller. This rotating impeller can be of an axial variety or of a centrifugal variety. Importantly, blades of this impeller move sufficiently rapidly and have a configuration selected to be effective in shearing the polymer gel emulsion when the polymer gel emulsion is passed along with water into the pump 40. This shearing action causes activation of the polymer gel emulsion and water combination, so that the water and polymer gel combination can have maximum firefighting effectiveness.

Other functions of the pump 40 are preferably provided by this same pump 40, but could conceivably be provided by a positive displacement pump or other non-dynamic pump or a dynamic pump which does not necessarily provide the shearing function. These other pumping purposes within the system 10 include supply of high energy flow for passage through the discharge assembly 60, such as including the nozzle 68, to provide a highly controllable stream S such as for striping particular areas of vegetation or other fuels in fighting fire. The pump 40 can also be utilized for mixing, such as to maintain the water and activated polymer gel emulsion as a homogenous mixture within the bucket 20.

The pump 40 also can act to draw water W into the bucket 20 without immediate polymer gel addition and activation. For instance, water W can be drawn through the outer port 32 (arrow B) up into the pump 40 without polymer gel addition, and then fill the bucket 20 through the fill assembly 50 (arrow C). Such water W can then later be discharged without polymer gel, such as through the discharge assembly 60 (or merely dumped from the bucket 20). Preferably the water later has the polymer gel added thereto by drawing the water W through the inner port 34 into the intake assembly 30 (arrow A) and then adding polymer gel through the polymer gel port 43, along with activation of the polymer gel 43 and water combination within the pump 40. The liquid can be simultaneously fed to the discharge assembly 60, or first return to the bucket 20 through the fill assembly 50, for later discharge through the discharge assembly 60 (arrow S) or for later dumping from the bucket 20.

With continuing reference to FIGS. 3-9, details of the fill assembly 50 are described, according to this first embodiment. The fill assembly 50 provides equipment for returning water or a combination of water and polymer gel emulsion downstream of the pump 40 and back into the bucket 20. The fill assembly 50 in this first embodiment includes a riser 52, typically extending up from the output 44 of the pump 40.

This riser 52 typically begins at a junction with the discharge assembly 60. A control valve 58 is provided at this junction, typically controlled by an associated actuator 59. The control valve 58 and actuator 59 can have a variety of different configurations similar to those described above with respect to the control valve 38 and actuator 39. The control valve 58 causes water downstream of the output 44 of the pump 40 to either be fed to the fill assembly 50 or to the discharge assembly 60.

The riser 52 of the fill assembly 50 includes at least one port 54 leading into the bucket 20 (arrow C). In the first embodiment depicted herein, three ports 54 are provided at different elevations extending from the riser 52. These ports 54 extend mostly laterally and horizontally away from the vertically extending riser 52, but with a slight downward angle. The ports 54 also preferably taper to a tip which has a smaller diameter than where the ports 54 interface with the riser 52, so that fluids passing through the ports 54 are accelerated before return back into the bucket 20. In alternative embodiments, no such tapering of the ports 54 could be provided as an alternative (or an opposite diffusing taper).

It is also conceivable that the ports 54 could be configured to be adjustable with a controlled adjustability as to whether the ports 54 impart some degree of spray into the bucket 20 (such as to enhance mixing within the bucket 20) or to minimize energy in the fluids returning to the ports 54 (such as to minimize energy and avoid splashing of fluids out of the bucket 20). If desired, the ports 54 can have various different orientations, such as to induce swirling within the bucket 20 or to defeat the potential for swirling within the bucket 20, and to enhance mixing within the bucket 20 without causing splashing from the bucket 20.

The fill assembly 50 can pass only water W back into the bucket 20 if the pump 40 is handling water W, such as when filling the bucket 20 through utilization of the outer port 32. The fill assembly 50 can alternatively handle a combination of water and activated polymer gel emulsion, such as when filling the bucket 20 through the outer port 32 and simultaneously adding polymer gel and activating the polymer gel through the pump 40 (or when water is already within the bucket 20, and is being routed from the inner port 34 through the pump 40 with the addition of polymer gel for activation thereof with the water, and return back into the bucket 20). The fill assembly 50 can also be utilized merely as a discharge of a mixing circuit when water and activated polymer gel emulsion are already within the bucket 20 and are drawn through the inner port 34 of the intake assembly 30 (arrow A) through the pump 40 and then routed back through the fill assembly 50 (arrow C) for mixing thereof and maintaining a homogenous mixture of water and activated polymer gel emulsion.

With continuing reference to FIGS. 3-9, details of the discharge assembly 60 are described, according to this first embodiment. The discharge assembly 60 provides for delivery of water or a combination of water and activated polymer gel emulsion from the bucket 20. One part of the discharge assembly 60 is to merely provide the floor 22 of the bucket 20 in a configuration that is openable so that water or water and polymer gel emulsion can be dumped from the bucket 20. Other dumping systems such as dumping systems which allow for tipping of the bucket 20 could also be utilized as a discharge element within the discharge assembly 60.

Most preferably, delivery of water or combined water and activated polymer gel emulsion is in a controlled manner through a nozzle 68. In particular, the discharge assembly 60 includes an up length 62 extending up from the output 44 of the pump 40, transitioning into an out length 64 which extends horizontally from the up length 62 and terminates at an interface 66. The nozzle 68 extends down from the interface 66 to a tip 69. In this first embodiment, the out length 64 extends sufficiently long so that the interface 66 and nozzle 68 can be located just outside of the bucket 20. The up length 62 is provided to elevate the liquid to above the side wall 24 of the bucket 20. The nozzle 68 preferably extends substantially vertically downward to the tip 69. The nozzle 68 tapers down so that the tip 69 defines a smallest cross-section which is preferably significantly wider than it is in a direction perpendicular to its width so that a fan of nozzle spray S is provided, effective for striping the ground with water or combined water and activated polymer gel emulsion.

The up length 62 begins at a junction with the fill assembly 50 where the control valve 58 is located. The control valve 58 is configured so that it can feed fluid to either the ports 54 of the fill assembly 50 or to the nozzle 68 of the discharge assembly 60. This control valve 68 is controlled, such as by signals provided along the control line 16, to achieve desired performance for the overall system 10.

With particular reference to FIGS. 7-9, various modes of operation of the system 10 are described, according to this first embodiment. In a first mode of operation, the bucket 20 is first loaded with water W, followed by addition of polymer gel emulsion and activation thereof with the water W, and finally followed by delivery from the bucket 20. Initial filling of the bucket 20 can occur by dipping of the bucket 20 into a body of water W (FIG. 1) or by pumping from the outer port 32 (along arrow B of FIG. 7). The pump 40 draws the water from the outer port 32 to the fill assembly 50 where the water W passes into the bucket 20 (along arrow C of FIG. 7). Control valves 38, 58 are set to cause water to be drawn through the outer port 32, up into the pump 40, and then to the fill assembly 50. With no polymer gel emulsion provided through the port 43 (in this first example), pure water W is supplied into the bucket 20.

Later, the control valve 38 is adjusted to cause the water W to be drawn into the inner port 34 of the intake assembly 30 (along arrow A of FIG. 8) and the polymer gel port 43 is opened. Then, with operation of the pump 40, water W is drawn into the pump 40 along with polymer gel 43 so that a combination of water and activated polymer gel emulsion is supplied by the pump 40. This combination can be delivered back into the bucket 20 through the fill assembly 50 if desired so that the bucket 20 now contains a combination of water and activated polymer gel emulsion. A similar operation of the system 10 can also be utilized after the water W has been converted into the combination of water and polymer gel emulsion, but with no polymer gel flow, should it be desired to mix the combination. When the combination is to be discharged from the bucket 20, the control valve 58 is adjusted to supply pressurized water and activated polymer gel emulsion through the discharge assembly 60 to the nozzle 58 and for discharge from the discharge assembly 60, along arrow S of FIG. 9.

In a second mode of operation, the system 10 can operate merely to provide stripes of water without addition of polymer gel. Water W is merely loaded into the bucket 20 as discussed above, and then drawn from within the bucket 20 through the inner port 34 (arrow A of FIG. 8), through action of the pump 40 to feed the water W through the discharge assembly 60 and out of the nozzle 68 (along arrow S of FIG. 9). Water W can alternatively be dumped (FIG. 9) from the floor 22 of the bucket 20. This second mode of operation and the first mode of operation can be selected by an operator utilizing the system 10 of this invention, depending on the desires of the user.

In a third mode of operation, second and third steps discussed above with regard to the first mode of operation are combined together. In particular, after the first step the bucket 20 has been loaded with water W. Later, this water W is simultaneously drawn through the inner port 34 (arrow A) into the pump 40, and polymer gel is added thereto through the polymer gel port 43 for combination and activation of the polymer gel emulsion with the water. The control valve 58 is set to feed this newly formed combination directly to the discharge assembly 60 where it is discharged from the nozzle 68 (along arrow S). Such a third mode of operation would typically occur after water W has been drawn into the bucket 20 at a source of water W (FIG. 1), and the aircraft 2 has traveled to a site where defense against wildfire is to occur. When it has become apparent that a combination of water and activated polymer gel is needed, this third mode of operation is activated and the water W is converted into the combination of water W and activated polymer gel for discharge from the nozzle 68 (along arrow S), such as in a striping action to lay down stripes of water and activated polymer gel.

In a fourth mode of operation, the polymer gel emulsion is activated and combined with the water W during the first step of the first mode of operation, so that the polymer gel is activated and combined with the water W, at the same time that the water W is brought into the bucket 20, through the outer port 32 of the intake assembly 30. In such a configuration, and mode of operation, the control valve 38 is set to cause water W to be drawn into the intake assembly 30 through the outer port 32 (arrow B), and the control valve 58 is set to deliver the water and activated polymer gel to the fill assembly 50 for filling of the bucket 20 (arrow C) with combined water W and activated polymer gel.

The aircraft 2 would typically then fly to a site where the load is to be delivered, and then the control valve 38 is adjusted to cause this fluid to be drawn into the inner port 34 (along arrow A of FIG. 8) and then to be passed through the pump 40, and with the control valve 38 set to feed the pressurized water W and polymer gel to the discharge assembly 60 and out of the nozzle 68 (along arrow S of FIG. 9). Alternatively, the combined water and activated polymer gel can merely be dumped from the bucket 20 by opening of the floor 22.

If significant times involved in transit between the source of water W and the fire fighting location, the pump 40 can initially be activated with the control valve 58 set to recirculate the fluid through the fill assembly 50 initially, for mixing within the bucket 20 and to ensure that a homogenous mixture is provided (FIG. 8) through flow along arrow C. After such mixing has occurred, the control valve 58 is adjusted to supply the fluid to the discharge assembly 60 and for spraying from the system through the nozzle 68 (along arrow S).

With particular reference to FIGS. 10-13, details of an alternative modular polymer gel emulsion preparation system 110 are described, according to a second embodiment of this invention. In this second embodiment, the bucket 20 preferably has a similar configuration to that described above. Furthermore, the same basic elements are provided in the system 110 of this second embodiment as with the system 10 of the first embodiment, except in a different configuration optimized for modularity, to retrofit into an existing bucket 20 or to more easily allow for integration of the system 110 with existing bucket designs.

In particular, the modular system 110 includes an alternate intake assembly 130 which includes an outer port 132 and an inner port 134. The outer port 132 is built into a floor of a bucket 120, typically in a central portion thereof, to draw water from outside of the bucket 120 (arrow B). A screen 135 surrounds the outer port 132. The inner port 134 has a configuration to allow for drawing of fluids above a floor of the bucket 120 (along arrow A). Check valves 136 are adjacent each of the ports 132, 134. A control valve 138 is located at a junction between the ports 132, 134 with an actuator 139 adjacent thereto to control the control valve 138. Function of the alternate intake assembly 130 is similar to that described above with the first embodiment intake assembly 30.

An alternate pump 140 is provided downstream of the alternate intake assembly 130. This pump 140 is similar to the pump 40 of the first embodiment, and includes an input 142 opposite an output 144 and with a gel port 143 between the input 142 of the pump 140 and the intake assembly 130.

An alternate fill assembly 150 is provided downstream of the output 144 of the pump 140. The alternate fill assembly 150 preferably is configured with an elbow 152 leading to a diffuser 154 and outlet 156 designed to deliver fluid back into the bucket 120, but with a low energy (along arrow C of FIGS. 11-13). Function of the alternate fill assembly 150 is similar to that of the fill assembly 50 described above.

An alternate discharge assembly 160 extends up from the alternate fill assembly 150 at a junction therewith, which is fitted with a control valve 158 and actuator 159 for controlling flow downstream of the pump 140, to either be directed to the fill assembly 150 or to the alternate discharge assembly 160. The alternate discharge assembly 160 includes an up length 162 terminating at a turn 164, which then leads to a down length 166 terminating in a nozzle 168. The nozzle 168 preferably passes through an assembly which also supports the outer port 132 of the intake assembly 130, and with a tip 169 of the nozzle 168 extending slightly below an under surface of the structure supporting the outer port 132 of the intake assembly 130. The discharge assembly 160 is thus to some extent modular with the intake assembly 130 so that only a single point of interface with the bucket 120 is required, and the nozzle 168 need not be suspended over a side of the bucket 120. The discharge assembly 160 is provided with the up length 162 and down length 166 sufficiently long so that the turn 164 and upper portions of the up length 162 and down length 166 can be coupled to a spider or other structure of the bucket 20, to provide structural support for the alternate modular system 110.

As an alternative to the discharge assembly 160 within the modular polymer gel preparation system 110, the turn 164 can be located significantly lower than that depicted in FIGS. 10-24. Elevating the turn 164 within the discharge assembly near the upper edge of the bucket provides a place within the system 110 where mounting to portions of the bucket 120 can occur. However, the system 110 could be mounted in other ways to the bucket 110. Elevating the turn has the benefit of keeping the discharge assembly 160 from allowing for flow out of the discharge assembly 160 when the pump 140 is not operating. In particular, it is conceivable that the fill assembly 150 would otherwise provide a pathway for fluid to pass forward from within the bucket 120, through the fill assembly 150 or the intake assembly 130 and then out of the discharge assembly 160, if the discharge assembly 160 is located below the fill assembly 150. By placing the turn 164 at an elevation similar to an upper edge of the bucket 120, such inadvertent flow into the discharge assembly 160 and ultimately the prospect of flow from the bucket 120 through the fill assembly 150 or intake assembly 130 and then out of the discharge assembly 160 is prevented. In alternative embodiments, this turn 164 could be located much lower within the bucket 120 or dispensed with altogether if a conduit from the pump 140 to the nozzle 168 follows a different path that does not require any turn such as the turn 164. In such alternative systems, inadvertent flow out of the bucket 120, such as through the fill assembly 150, can be prevented by controlling pump intake control valve 138 and/or pump fill control valve 158.

With particular reference to FIGS. 14-18, a variation on the second embodiment modular system 110 is described. In this embodiment the bucket 20 is modified to include a sump recess 123. The intake assembly 130 is fitted with an alternate inner port 133 which is also located down within this sump recess 123. More complete evacuation of the bucket 20 can thus be achieved. Other features of this variation in the modular system 110 shown in FIGS. 14-18 are similar to those described above with the primary configuration of the modular system 110 depicted in FIGS. 10-13.

With particular reference to FIGS. 19-24, details of a further alternative high capacity polymer gel emulsion preparation system 210 are described, according to a third embodiment of the invention disclosed herein. With this high capacity system 210, subparts of the system 210 are provided in a tandem configuration to allow similar components to be utilized as with previous embodiments, but to approximately double output from the system 210. This system 210 can also optionally be adjustable between high capacity and low capacity by limiting operation to one set of subcomponents.

In particular, an intake assembly 230 is provided which includes a pair of outer ports 232 and a pair of inner ports 234. Check valves 236 are provided adjacent each of these ports 232, 234. A common screen 235 preferably surrounds each of the outer ports 232 and is located just below a floor of the bucket 20. The intake assemblies 230 function similar to those of previous embodiments, except in tandem.

A pair of pumps 240 are provided downstream of the pair of intake assemblies 230. A pair of fill assemblies 250 and a pair of discharge assemblies 260 are provided downstream of the pump 240 which can be selectively chosen for flow passing from the pump 240. The fill assemblies 250 are preferably substantially similar to the fill assemblies of previous embodiments.

Figure 19:
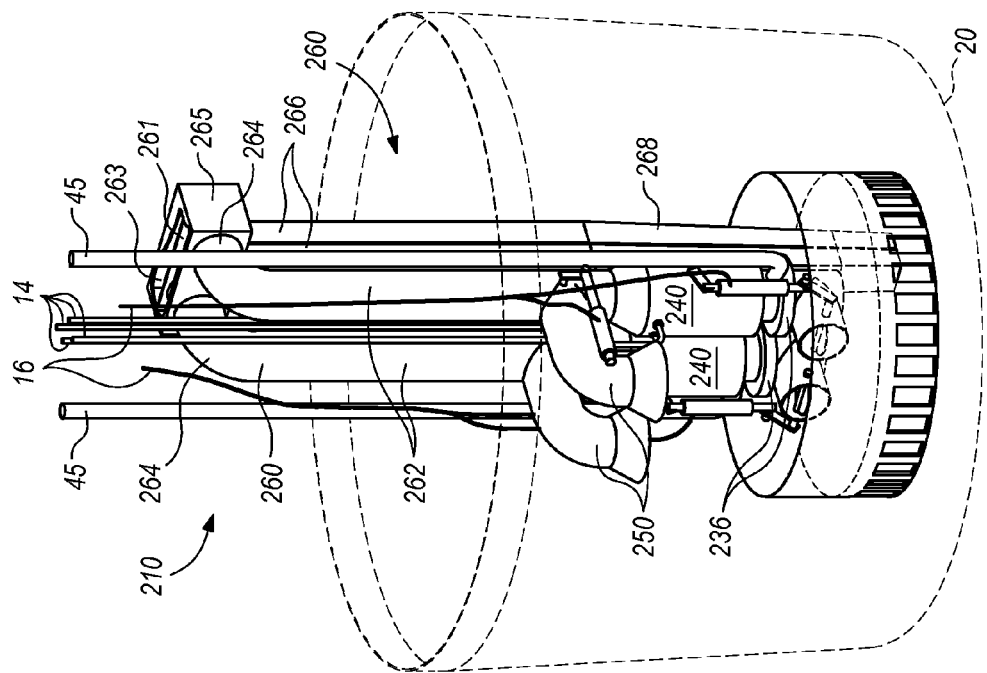
FIG. 19 is a perspective view of a third embodiment of that which is shown in FIG. 10 in a high capacity variation with tandem intake assemblies and fill assemblies as well as tandem pumps.
Figure 18:
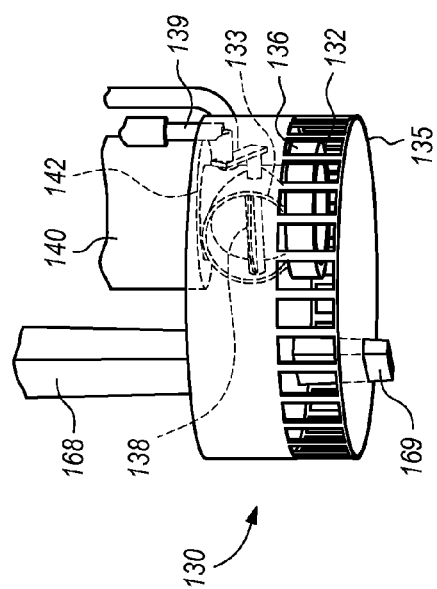
FIG. 18 is a perspective detail of a lower portion of that which is shown in FIG. 16, revealing details of an intake assembly locatable within the sump recess of the bucket for intake of water either within a lower portion of the bucket or from outside of the bucket.
Figure 21:
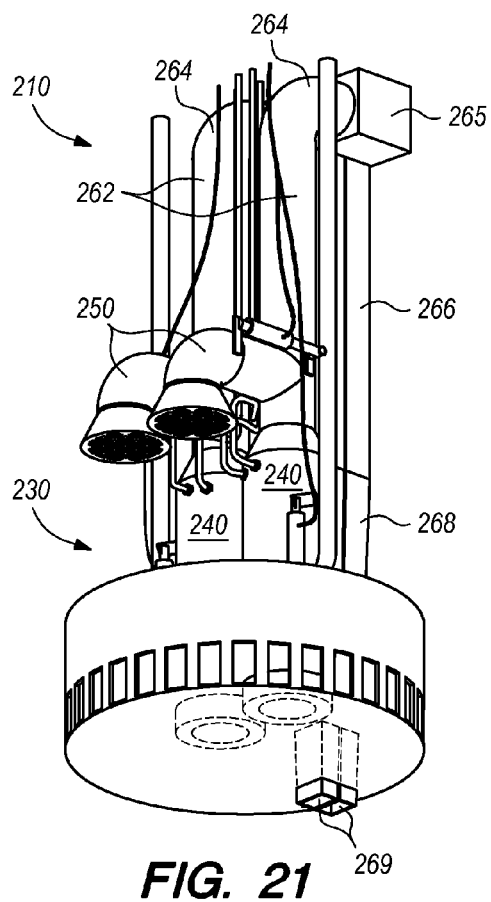
FIG. 21 is a perspective view of that which is shown in FIG. 19, shown enlarged and without the bucket to reveal details of this third embodiment.
Figure 22:
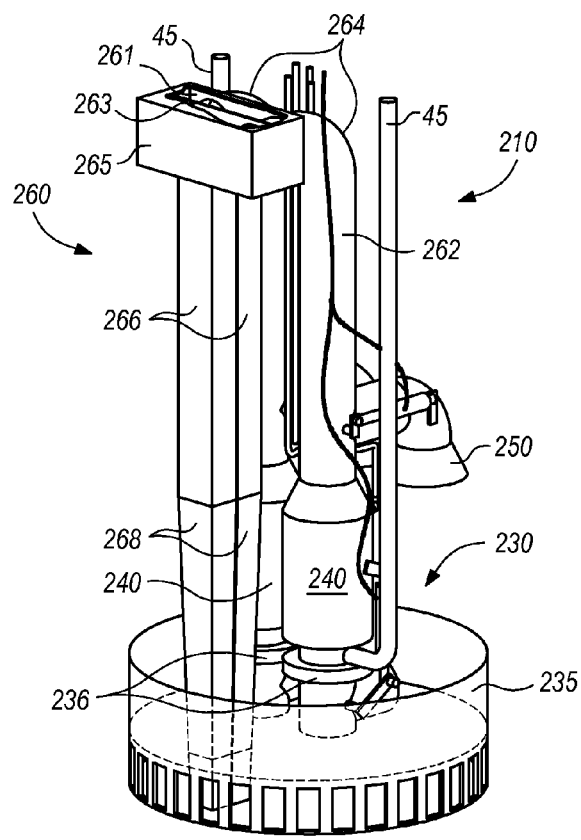
FIG. 22 is a perspective view similar to that which is shown in FIG. 21 but from a different point of view to further reveal details of this third embodiment.
Figure 23:
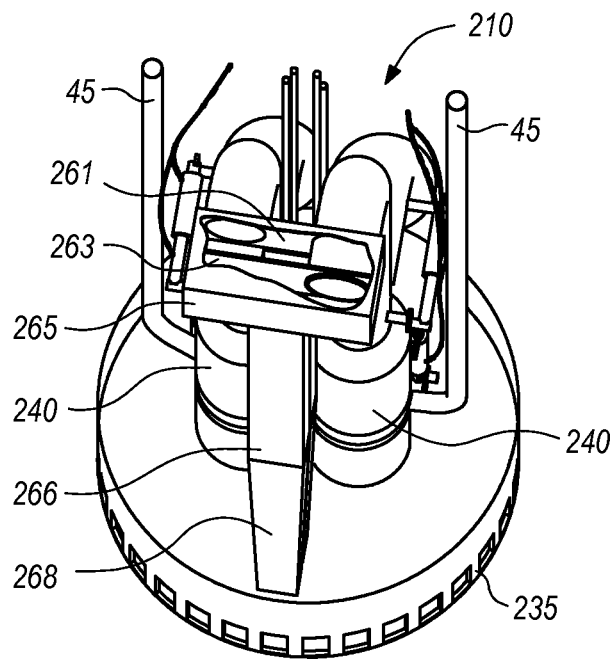
FIG. 23 is a perspective view from above of that which is shown in FIGS. 21 and 22.
Figure 24:
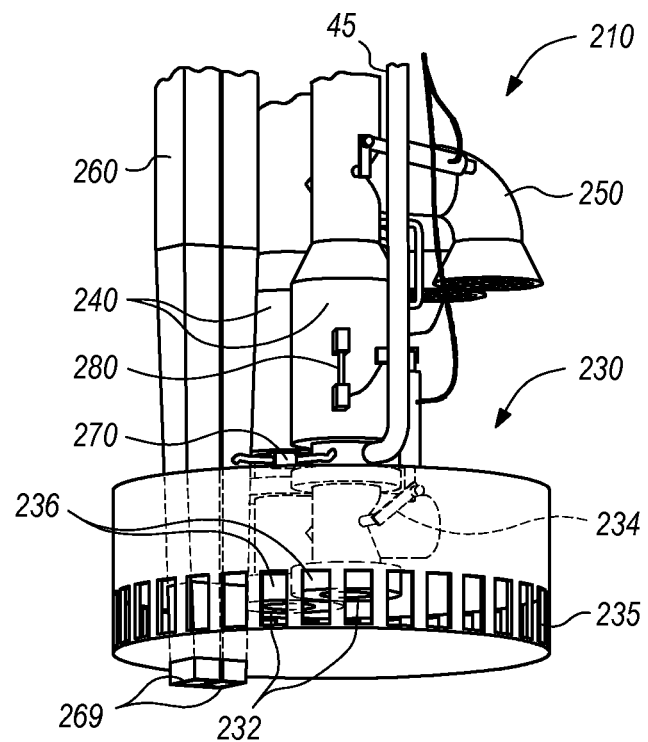
FIG. 24 is a perspective view in detail of a lower portion of the third embodiment of FIG. 19, revealing details of the intake assemblies and various accessories utilizable in optional variations to this third embodiment of the invention.

Uniquely, the discharge assembly 260 is modified somewhat to allow for consolidation of a pair of nozzles 268 leading to adjacent tips 269. In particular, the discharge assemblies 260 include up lengths 262 which terminate at turns 264 which each feed into a common box 265. The box 265 includes a front compartment 261 and a rear compartment 263 (FIGS. 19 and 23). One of the turns 264 feeds into the front compartment 261 and the other turn 264 feeds to the rear compartment 263. The front compartment 261 leads to a front nozzle 268 and the rear compartment leads to a rear nozzle 268. These two nozzles 268 are similar to each other, and stacked one in front of the other. Wider dimensions of the nozzles 268 are in common with dimensions opposite the widths of the nozzles 268 stacking together so that the two tips 269 have a compact adjacent relative configuration (FIG. 21). In a high capacity high discharge operation, two fans of fluid are discharged from the system 210 which are adjacent each other, and allow for fluid spray at twice the flow rate. Such a high flow rate can allow for liquid to be discharged in a thicker layer or for the aircraft 2 to travel at twice the speed as would otherwise be the case and provide a similarly thick layer of liquid, or for the aircraft to fly twice as high and provide a wider stripe of treated vegetation or other surface materials to be coated.

The high capacity system 210 and other systems 10, 110 of other embodiments can be fitted with a bleed system 270 and a purge system 280 in variations thereof. The bleed system 270 (FIG. 24) provides a line extending to the discharge assembly 260 somewhere above the tips 269 of at least one of the nozzles 268. This at least one bleed line extends from a portion of the fluid pathway 230 and the pump 240. When the pump 240 ceases operation, some fluid remains within fluid pathways upstream of and within the pump 240, and to some extent downstream of the pump 240 but elevated above the pump 240. The bleed line 270 can be opened and allow flow by gravity of these residual fluids out of the pump 240 and portions of the fluid pathway adjacent to the pump 240, to drain out of the system 210 through the nozzle 268.

Such bleed is desirable in that the water with activated polymer gel emulsion therein is best utilized at the site where this fluid is required, rather than remaining in the system for later cleaning thereof. The bleed line 270 can be sufficiently small so that it is merely always open and allows for slow draining of fluids remaining in the system. However, the bleed line 270 preferably has a valve thereon configured to be open unless the pump 240 is operating, or can be a full control valve which opens and closes consistent with an operator's input or automated systems programmed to provide bleed of fluid from the system when desired. The bleed system 270 can also function during cleaning of the equipment and to bleed out condensate, rainwater (if stored outside) or other liquids, and keep the flow paths relatively dry during storage. Bleed or otherwise drawing water from the system is beneficial in that it reduces weight that need be carried by the aircraft 2 while ferrying back and forth. Also, an empty bucket is easier to "land" than a full bucket during refueling or other operations and easier to handle after it has "landed."

The purge system 280 preferably includes a pair of fluid sensors spaced vertically from each other, and located within the bucket 20 at a strategic location. One location for this purge sensor array is on a side wall of the pump 240. A pair of liquid sensors are spaced apart from each other vertically to avoid sloshing of fluids within the bucket 20 causing inadvertent early activation of the purge system 280. With further spacing apart, inadvertent operation is further resisted. When each of the sensors detect the absence of liquid, the purge system 280 would cause the polymer gel port 43 (FIGS. 3-9) to be closed (and/or dosing pump to be turned off). Then, instead of continuing to draw both polymer gel and water W into the pump 240, only water W is pulled into the pump 240 at the time when the bucket 20 is reaching a state of being entirely empty. With water W flowing through the intake assembly 230, pump 240 and discharge assembly 260, residual activated polymer gel is scrubbed from these subparts of the system before the pump 240 runs dry and ceases operation altogether. In this way, when the system 210 ceases operation, it has been to a great extent self-cleaned and purged of activated polymer gel.

Figure 25:
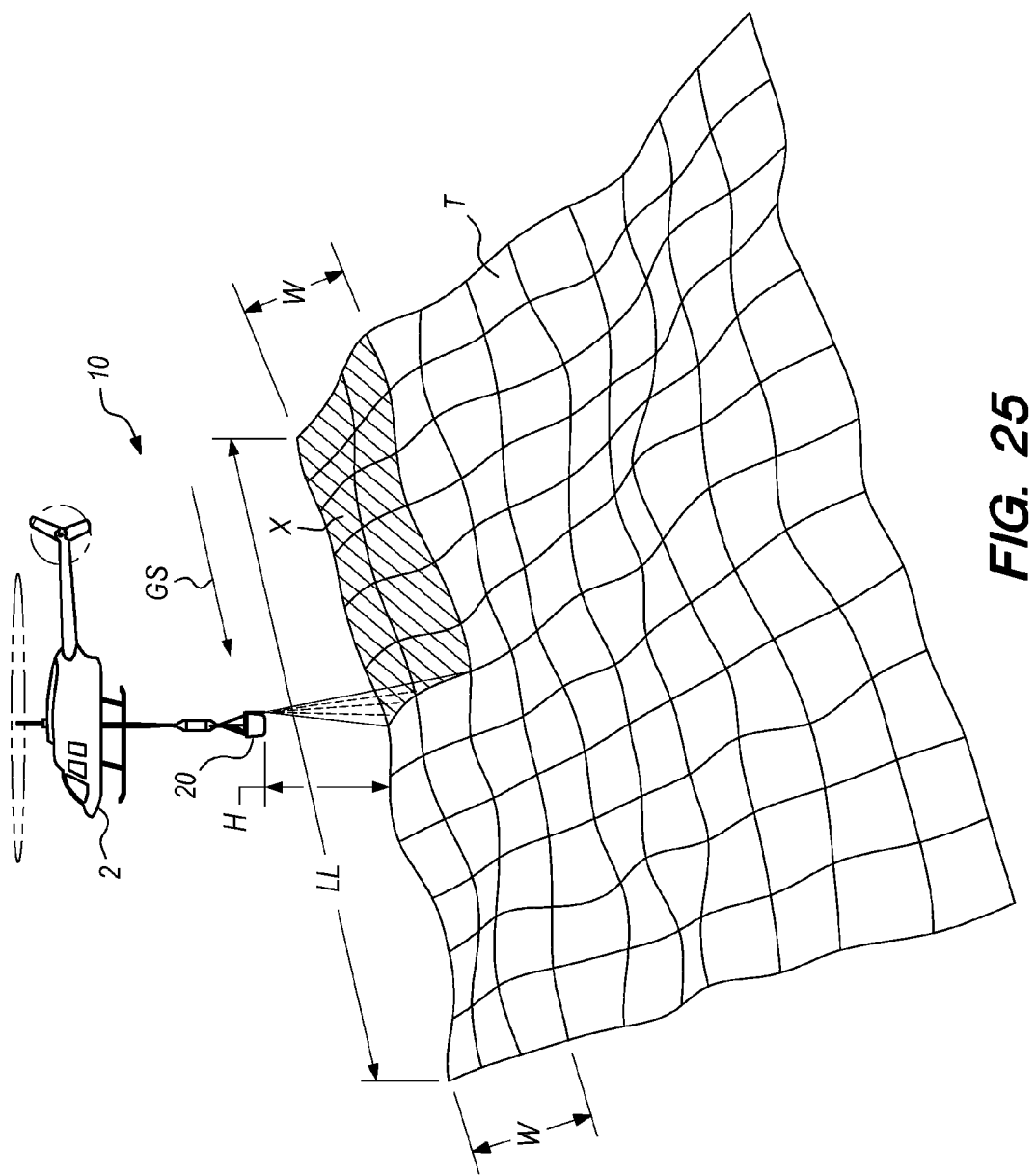
FIG. 25 is a perspective view of a firefighting aircraft configured with the system of this invention and flying over terrain, and applying a firefighting liquid onto the terrain in a stripe.
Figure 26:
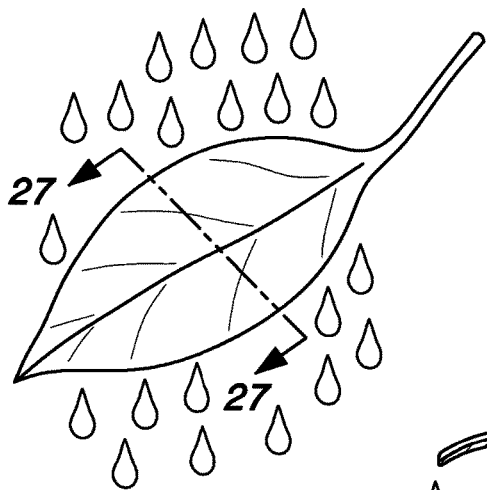
FIG. 26 is a perspective view of a leaf of vegetation according to the prior art, illustrating how water applied to vegetation wets the vegetation but most of the water falls off of the vegetation.
Figure 27:
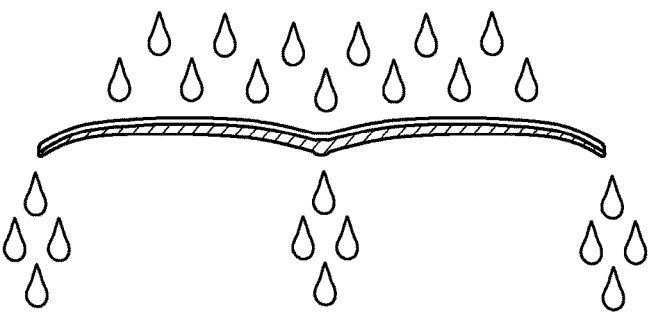
FIG. 27 is a sectional view taken along line 27-27 of FIG. 26 illustrating how in the prior art only a very thin coating of water is provided on a leaf or other vegetation when it is wetted.
Figure 28:
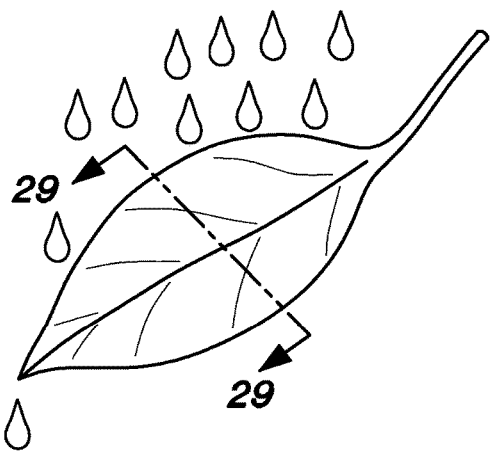
FIG. 28 is a perspective view of a leaf of vegetation illustrating how water and polymer gel sprayed onto a leaf tends to stick to the leaf and maintain a thick coating of water and gel on the surface of the leaf that has been sprayed, with only small amounts falling off of the leaf, depending on the viscosity of the gel.
Figure 29:
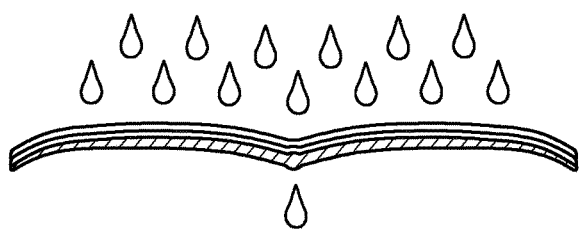
FIG. 29 is a sectional view taken along line 29-29 of FIG. 28 showing the leaf of FIG. 28 in cross-section.

With particular reference to FIG. 25, details of the method associated with the system 10 of this invention are described. When fighting a wildfire, terrain T is involved. This terrain T can be covered with fuels in the form of vegetation (e.g. grasses, shrubs, trees, etc.) and/or fuels in the form of structures (e.g. houses, outbuildings, utility buildings, etc.) and other manmade structures formed of combustible materials. When fire, and particularly wildfire is advancing upon the terrain, fuel upon the terrain is combusted by the fire and provides a heat source from which the fire can propagate to adjacent unburned fuels on the terrain T.

A chain reaction is thus created which is amplified by the type and amount of fuel, the geometry of the terrain itself, and environmental factors such as wind, temperature and humidity. Generally, once fuel has been ignited by the fire, the fire can "burn out." Thus, it is often not as important to directly put out the interior of the fire as it is to keep the fire perimeter from advancing, so that the fire can consume fuel within a confined perimeter and then go out when the fuel has been consumed. As an alternative, the fire can be fought directly, such as by spraying water directly upon the fire to attempt to "put out" the fire before it consumes all of the fuel.

A primary liquid utilized in fighting wildfire is water. Water is relatively abundant and has a high heat capacitance relative to other liquids. Hence, it takes a large amount of heat to elevate a fixed amount of water a fixed number of degrees, relative to other liquids. If the fire cannot elevate the temperature of unburned fuels to the point of ignition, the fire will not spread and burn out. Because wildfires and other types of fires often burn over large areas with exceptionally high heat energy outputs, and often in rugged terrain, the logistics involved in placing enough water directly on such a large fire over rugged terrain are insurmountable. Thus, a tactic is often employed where the fire is attempted to be contained within boundaries (often referred to as fire lines) and to some extent structures within these boundaries are individually defended. In this manner, the fire will dissipate its energy within the confined area and then burn out rather than being put out by direct application of water thereon.

In containing such wildfires, various techniques can be used including bulldozers or hand tools to remove fuels along the fire line. Fire retardants, which can be solid or liquid, are also known to be applied to the terrain, often through utilization of aircraft, to create and augment such fire lines. Augmenting can include application of fire retardants directly upon the fire or can include making the fire lines wider. Creation of fire lines can involve applying the firefighting chemicals directly upon untreated portions of the terrain in hopes that a sufficient treatment will act as a barrier against further advance of the wildfire across the fire line.

Water is an effective firefighting chemical which can be applied by tanker airplane or rotor wing aircraft (e.g. helicopters), often utilizing a bucket suspended therebeneath, but also potentially with a fixed tank thereon. A water source, preferably close to where the fire line is to be constructed, is utilized to fill the bucket, typically by dipping, and then the bucket is flown to an area to be treated with the water to establish or augment the fire line. The bucket has a bottom which can be opened to dump the water therefrom. The water falls in a haphazard pattern generally focused on a portion of the terrain T directly below the bucket.

Multiple problems are presented with this approach. First, the coverage level is highly non-uniform, with some areas being over treated and other areas being under treated. This is particularly problematic because the aircraft can only carry a limited amount of water. The distance that the aircraft must fly from the source of water to its location of dumping, and the difficulties in utilizing multiple aircraft in a similar area further augment the problem associated with such uneven dumping.

Figure 2:
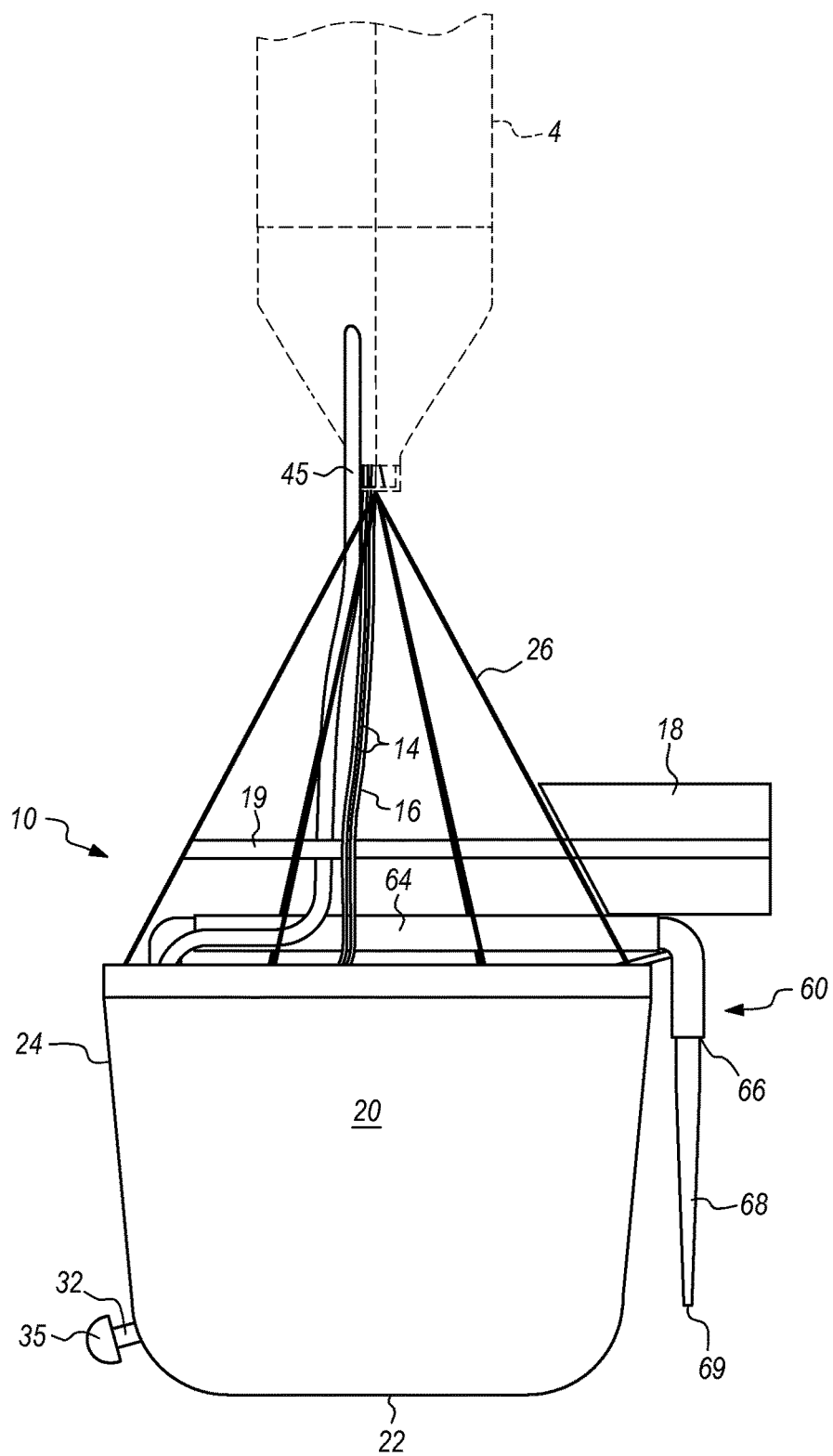
FIG. 2 is a side elevation view of a detail of a portion of that which is shown in FIG. 1, illustrating further details of the bucket of this invention.
Figure 3:
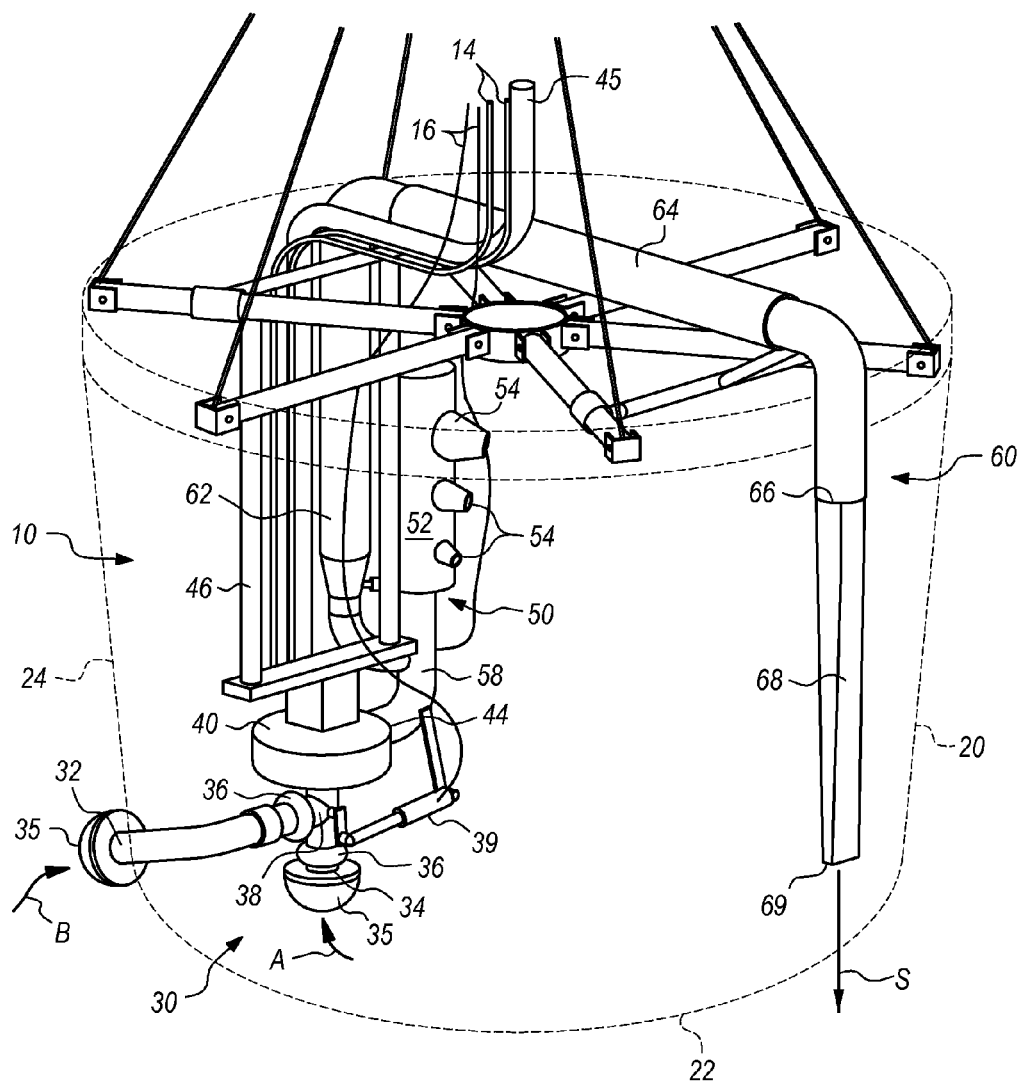
FIG. 3 is a perspective view of a bucket which has been fitted with the polymer gel emulsion preparation system of this invention according to a first embodiment.
Figure 12:
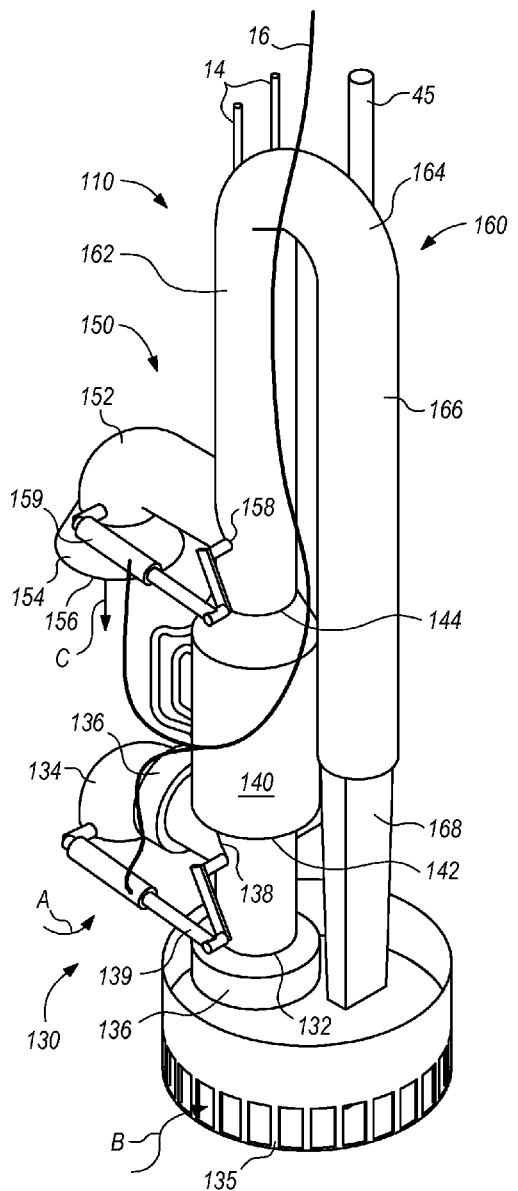
FIG. 12 is a perspective view of the modular polymer gel emulsion preparation system of the second embodiment, shown in detail without the bucket for clarity.
Figure 13:
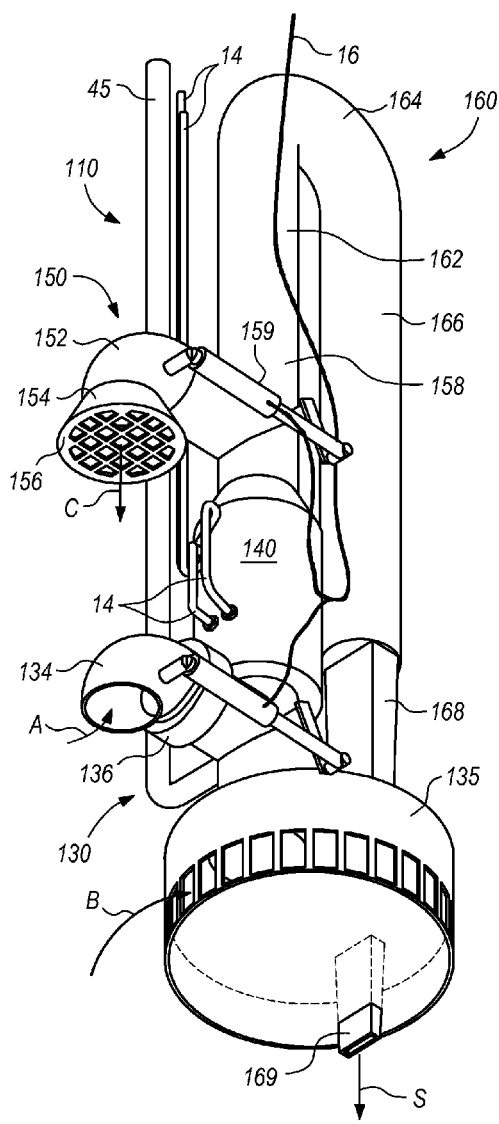
FIG. 13 is a perspective view similar to that which is shown in FIG. 12, but from a different orientation to reveal further details of the invention according to this second embodiment.
Figure 16:
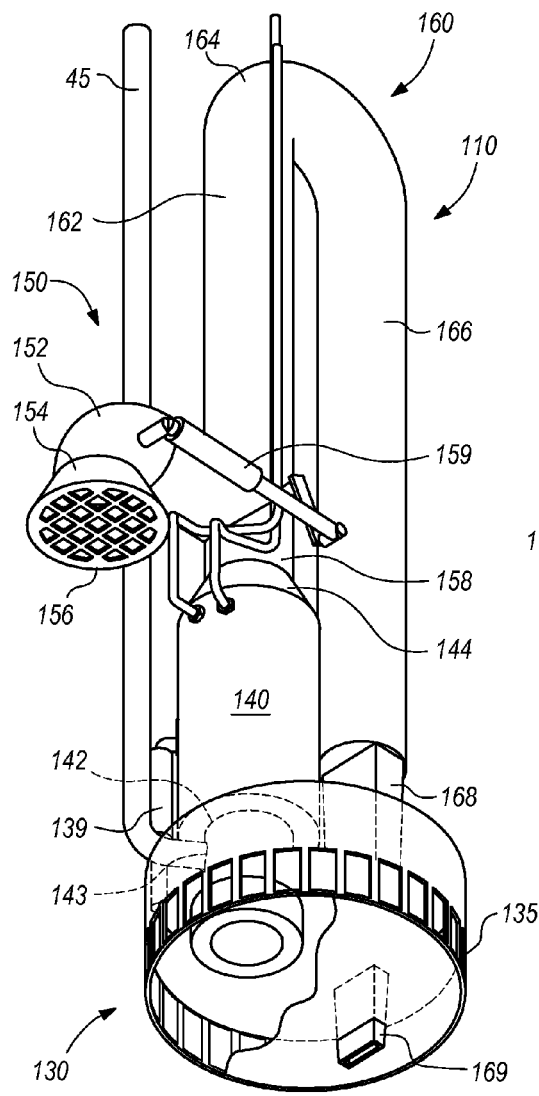
FIG. 16 is a perspective view of that which is shown in FIG. 14, enlarged and without the bucket to further show details thereof.
Figure 17:
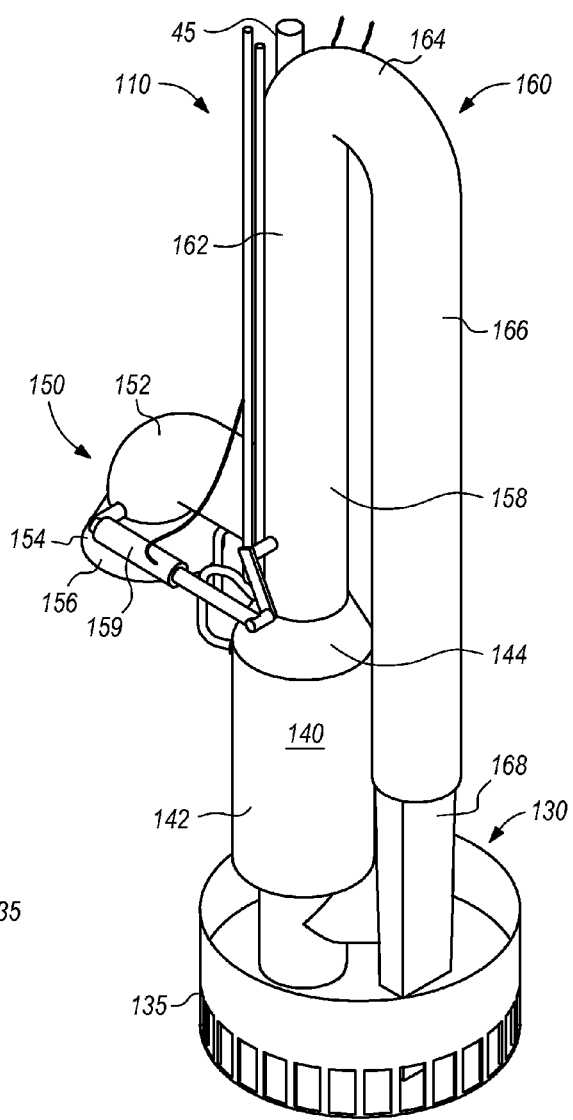
FIG. 17 is a perspective view of that which is shown in FIG. 16, but from a different angle to further reveal details of the invention according to this embodiment.

With this invention, a stripe X of firefighting liquid (FIG. 25), such as water or water and polymer gel are applied in a stripe X upon the terrain T. Utilizing the nozzle 68, the spray S (FIG. 2) is laid down in a uniform path of fixed width W (FIG. 25) which is established by a height H of the nozzle 68 above the terrain T and a geometry of the nozzle 68.

The nozzle 68 preferably tapers at its tip so that it has a narrow and wide opening at the tip 69. The spray S is thus in the form of a fan. The rudder 18 (FIG. 2) helps to keep this fan oriented perpendicular to a direction of aircraft 2 travel. A coverage level, which can also be thought of as a thickness of the liquid upon the terrain within the stripe X can be controlled by adjusting the ground speed GS of the aircraft 2. An overall line length LL for the stripe X can thus be provided where uniform application of firefighting liquid is provided. The nozzle 68 could conceivably have adjustable geometry so that the width W could be controlled by controlling a width of the tip 69 of the nozzle 68. However, most preferably the nozzle 68 is fixed and width W is adjusted by adjusting the height H of the aircraft 2. The coverage level can be increased by increasing the flow rate of liquid from the system 10, or by decreasing the ground speed, or decreasing height, or some combination. Overall line length LL, and coverage levels are further affected by the general relationship of the different parameters of the stripe X of firefighting liquid being applied.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for fighting a fire with an aircraft, including the steps of:
    providing a bucket suspended by an elongate line beneath the aircraft with a water intake at a lower portion of the bucket, a pump downstream of the water intake, the pump adapted to increase pressure of water passing therethrough, a polymer gel input port between the water intake and the pump, the polymer gel input port coupled to a source of polymer gel, a bucket fill downstream of the pump whereby water can be routed from the pump into the bucket, a discharge downstream of the pump whereby water can be routed from the pump to a location outside of the bucket, and a control valve downstream of the pump, the control valve selectable between allowing flow to the bucket fill or flow to the discharge;
    loading the bucket with water;
    dosing the water with polymer gel;
    activating the polymer gel by imparting shear upon the water and polymer gel emulsion combination; and
    discharging the water and polymer gel emulsion combination onto an area to be defended against fire.

2. The method of claim 1 wherein said loading step includes the steps of:
    utilizing the water intake and the pump to draw water out of a body of water outside of the bucket;
    filling the water without polymer gel into the bucket;
    later utilizing the pump to draw water from within the bucket into the pump while dosing the water with polymer gel to create a water and polymer gel emulsion combination according to said activating step; and
    discharging the water and polymer gel emulsion combination according to said discharging step.

3. The method of claim 1 wherein said loading step and said dosing step occur simultaneously through action of the pump within the bucket drawing water from the water intake from outside of the bucket and supplying polymer gel from the polymer gel input port.

4. The method of claim 3 wherein said loading step and said dosing include:
    filling the bucket with a water and polymer gel emulsion combination through the bucket fill;
    mixing the water and polymer gel emulsion combination through utilization of the pump and bucket fill; and
    after said mixing step, utilizing said pump and an inner port within the bucket and associated with the water intake to feed the discharge with the water and polymer gel emulsion combination.

5. A method for fighting a fire with an aircraft, including the steps of:
    suspending a bucket by an elongate line beneath the aircraft with a water intake at a lower portion of the bucket, a pump downstream of the water intake, the pump adapted to increase pressure of water passing therethrough, a polymer gel input port between the water intake and the pump, the polymer gel input port coupled to a source of polymer gel, a bucket fill downstream of the pump whereby water can be routed from the pump into the bucket, a discharge downstream of the pump whereby water can be routed from the pump to a location outside of the bucket, and a control valve downstream of the pump, the control valve selectable between allowing flow to the bucket fill or flow to the discharge;
    loading the bucket with water;
    dosing the water with polymer gel;
    activating the polymer gel by imparting shear upon the water and polymer gel emulsion combination; and
    discharging the water and polymer gel emulsion combination onto an area to be defended against fire.

6. The method of claim 5 wherein said loading step includes the steps of:
    utilizing the water intake and the pump to draw water out of a body of water outside of the bucket;
    filling the water without polymer gel into the bucket;
    later utilizing the pump to draw water from within the bucket into the pump while dosing the water with polymer gel to create a water and polymer gel emulsion combination according to said activating step; and
    discharging the water and polymer gel emulsion combination according to said discharging step.

7. The method of claim 5 wherein said loading step and said dosing step occur simultaneously through action of the pump within the bucket drawing water from the water intake from outside of the bucket and supplying polymer gel from the polymer gel input port.

8. The method of claim 7 wherein said loading step and said dosing include:
    filling the bucket with a water and polymer gel emulsion combination through the bucket fill;
    mixing the water and polymer gel emulsion combination through utilization of the pump and bucket fill; and
    after said mixing step, utilizing said pump and an inner port within the bucket and associated with the water intake to feed the discharge with the water and polymer gel emulsion combination.

* * * * *